(12) United States Patent
Hamburg et al.

(10) Patent No.: US 11,895,109 B2
(45) Date of Patent: *Feb. 6, 2024

(54) SECURELY PROVISIONING A TARGET DEVICE

(71) Applicant: Cryptography Research, Inc., San Jose, CA (US)

(72) Inventors: Michael Hamburg, Laguna Beach, CA (US); Benjamin Che-Ming Jun, Burlingame, CA (US); Paul C. Kocher, San Francisco, CA (US); Daniel O'Loughlin, Aptos, CA (US); Denis Alexandrovich Pochuev, Lafayette, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,226

(22) Filed: Apr. 15, 2022

(65) Prior Publication Data

US 2022/0329587 A1    Oct. 13, 2022

Related U.S. Application Data

(63) Continuation of application No. 16/804,555, filed on Feb. 28, 2020, now Pat. No. 11,310,227, which is a
(Continued)

(51) Int. Cl.
*H04L 9/40* (2022.01)
*H04W 12/06* (2021.01)
(Continued)

(52) U.S. Cl.
CPC ........ *H04L 63/0853* (2013.01); *G06F 21/335* (2013.01); *G06F 21/602* (2013.01);
(Continued)

(58) Field of Classification Search
CPC ... H04L 63/0853; H04L 63/062; H04L 67/60; H04W 12/0431; H04W 12/35;
(Continued)

(56) References Cited

U.S. PATENT DOCUMENTS 7,279,176 B1   10/2007   West et al.
7,624,432 B2   11/2009   Wood
(Continued)

FOREIGN PATENT DOCUMENTS

CN   101228770 A   7/2008
CN   103229143 A   7/2013
(Continued)

OTHER PUBLICATIONS

Alves, Tiago et al., TrustZone: Integrated Hardware and Software Security, Enabling Trusted Computing in Embedded Systems, Nov. 2004, ARM Information Quarterly, vol. 3, No. 4, pp. 18-24. 7 pages.
(Continued)

*Primary Examiner* — Ashokkumar B Patel
*Assistant Examiner* — William B Jones
(74) *Attorney, Agent, or Firm* — Lowenstein Sandler LLP

(57) ABSTRACT

The embodiments described herein describe technologies for Module management, including Module creation and Module deployment to a target device in an operation phase of a manufacturing lifecycle of the target device in a cryptographic manager (CM) environment. One implementation includes a Root Authority (RA) device that receives a first command to create a Module and executes a Module Template to generate the Module in response to the first command. The RA device receives a second command to create a deployment authorization message. The Module and the deployment authorization message are deployed to an Appliance device. A set of instructions of the Module, when permitted by the deployment authorization message and
(Continued)

executed by the Appliance device, results in a secure construction of a sequence of operations to securely provision a data asset to the target device.

20 Claims, 17 Drawing Sheets

Related U.S. Application Data continuation of application No. 16/004,715, filed on Jun. 11, 2018, now Pat. No. 10,581,838, which is a continuation of application No. 14/535,194, filed on Nov. 6, 2014, now Pat. No. 10,015,164.

(60) Provisional application No. 61/989,993, filed on May 7, 2014, provisional application No. 61/990,050, filed on May 7, 2014, provisional application No. 61/990,044, filed on May 7, 2014.

(51) Int. Cl.
| | | |
|---|---|---|
| *G06F 21/60* | (2013.01) | |
| *G06F 21/62* | (2013.01) | |
| *G06F 21/72* | (2013.01) | |
| *G06F 21/73* | (2013.01) | |
| *G06F 21/33* | (2013.01) | |
| *H04W 12/30* | (2021.01) | |
| *H04W 12/0431* | (2021.01) | |
| *H04L 67/60* | (2022.01) | |

(52) U.S. Cl.
CPC .......... *G06F 21/6209* (2013.01); *G06F 21/72* (2013.01); *G06F 21/73* (2013.01); *H04L 63/0428* (2013.01); *H04L 63/062* (2013.01); *H04L 67/60* (2022.05); *H04W 12/0431* (2021.01); *H04W 12/06* (2013.01); *H04W 12/35* (2021.01); *G06F 2221/2107* (2013.01); *G06F 2221/2135* (2013.01); *G06F 2221/2145* (2013.01); *G06F 2221/2149* (2013.01); *G06F 2221/2153* (2013.01); *H04L 63/123* (2013.01)

(58) Field of Classification Search
CPC .... H04W 12/06; G06F 21/335; G06F 21/602; G06F 21/6209; G06F 21/72; G06F 21/73; G06F 2221/2107; G06F 2221/2135; G06F 2221/2145; G06F 2221/2149; G06F 2221/2153
See application file for complete search history.

(56) References Cited

U.S. PATENT DOCUMENTS

| | | | | |
|---|---|---|---|---|
| 7,877,461 | B1* | 1/2011 | Rimmer | ............ H04M 1/72406 |
| | | | | 717/168 |
| 8,843,764 | B2 | 9/2014 | Hussain | |
| 2006/0080172 | A1 | 4/2006 | Najarian et al. | |
| 2006/0294103 | A1 | 12/2006 | Wood | |
| 2007/0021843 | A1 | 1/2007 | Neill et al. | |
| 2007/0282951 | A1* | 12/2007 | Selimis | ................ H04L 69/08 |
| | | | | 709/205 |
| 2009/0300758 | A1 | 12/2009 | Hauck et al. | |
| 2011/0019695 | A1 | 1/2011 | Wu et al. | |
| 2011/0063093 | A1 | 3/2011 | Fung et al. | |
| 2012/0036440 | A1* | 2/2012 | Dare | ....................... G06F 9/452 |
| | | | | 715/734 |
| 2013/0054474 | A1 | 2/2013 | Yeager | |
| 2013/0127862 | A1 | 5/2013 | Grewal | |
| 2013/0145140 | A1 | 6/2013 | Hsien | |
| 2014/0164775 | A1* | 6/2014 | Wu | ........................ H04L 63/10 |
| | | | | 713/171 |
| 2015/0326540 | A1 | 11/2015 | Hamburg et al. | |
| 2015/0326567 | A1 | 11/2015 | Hamburg et al. | |
| 2016/0072629 | A1 | 3/2016 | Kulkarni | |
| 2017/0039389 | A1* | 2/2017 | Smith | ................. G06F 21/6245 |

FOREIGN PATENT DOCUMENTS

| | | |
|---|---|---|
| CN | 103430183 A | 12/2013 |
| EP | 1416353 A2 | 5/2004 |
| EP | 2341457 A2 | 7/2011 |
| TW | 201237762 A | 9/2012 |
| TW | I427548 A | 2/2014 |
| WO | WO-1998-043212 A1 | 10/1998 |

OTHER PUBLICATIONS

CN Office Action dated Feb. 3, 2019 re: CN Appln. No. 201580031528. 8. 34 Pages (No Translation).
CN Response Filed on Jun. 18, 2019 in Response to CN Office Action dated Feb. 3, 2019 re: CN Appln. No. 201580031528.8. 13 Pages. (No Translation).
Communication Pursuant to Article 94(3) EPC dated Aug. 9, 2018 re: EP Appln. No. 15724848.5. 6 Pages.
EP Communication Pursuant to Article 94(3) EPC dated Dec. 18, 2017 re: EP Appln. No. 15724848.5. 4 Pages.
EP Response filed on Feb. 19, 2019 in Response to the Official Communication Pursuant to Article 94(3) EPC dated Aug. 9, 2018 re: EP Appln. No. 15724848.5. 14 Pages.
EP Response Filed on Apr. 5, 2018 in Response to the Communication Pursuant to Art. 94(3) EPC dated Dec. 18, 2017 re: EP Appln. No. 15724848.5. 20 Pages.
Notification Concerning Transmittal of International Preliminary Report on Patentability dated Nov. 17, 2016 re: Int'l Appln. No. PCT/US2015/029077. 7 Pages.
PCT International Search Report and Written Opinion dated Jul. 16, 2015 in International Application No. PCT/US2015/029078. 10 pages.
PCT International Search Report and Written Opinion dated Jul. 16, 2015 in International Application No. PCT/US2015/029081. 10 pages.
PCT International Search Report and Written Opinion dated Jul. 22, 2015 in International Application No. PCT/US2015/029077. 10 pages.
TW Office Action dated Dec. 6, 2019 re: TW Appln. No. 108129941. 20 Pages (W/Translation).
TW Office Action dated Dec. 9, 2019 re: TW Appln. No. 108129941. 12 Pages. (No Translation).
TW Office Action dated Mar. 27, 2019 re: TW Appln. No. 104112472. 19 Pages. (W/Translation).
TW Response as Filed on Jun. 24, 2019 in Response to the TW Office Action dated Mar. 27, 2019 re: TW Appln. No. 104112472. 4 Pages. (No Translation).
CN Office Action dated Apr. 15, 2023 re: CN Appln. No. 201911000015. 7. 7 pages. (w/Translation).

* cited by examiner

SECURELY PROVISIONING A TARGET DEVICE

RELATED APPLICATIONS

This application is continuation of U.S. application Ser. No. 16/804,555, filed Feb. 28, 2020, which is a continuation of U.S. application Ser. No. 16/004,715, filed Jun. 11, 2018, now U.S. Pat. No. 10,581,838, which is a continuation of U.S. application Ser. No. 14/535,194, filed Nov. 6, 2014, now U.S. Pat. No. 10,015,164, which claims the benefit of U.S. Provisional Application No. 61/990,044, filed May 7, 2014, U.S. Provisional Application No. 61/990,050, filed May 7, 2014, and U.S. Provisional Application No. 61/989,993, filed May 7, 2014, the entire contents of which are incorporated by reference. This application is related to U.S. application Ser. No. 14/535,197, filed Nov. 6, 2014, now U.S. Pat. No. 9,923,890 and U.S. application Ser. No. 14/535,202, filed Nov. 6, 2014, now U.S. Pat. No. 9,584,509.

BACKGROUND

Presently, system-on-a-chip (SoC) vendors may sell many different varieties of the same "integrated circuit (also referred to as "chip" or "IC"), where each variety is configured for a particular application. IC configuration often occurs by blowing one or more fuses or otherwise programming a one-time programmable memory on the IC. This type of IC configuration is generally a one-way process and cannot be undone. One method of circumventing the permanence of the configuration process is to add redundant or spare bits within the one-time programmable memory that can be combined to modify a previous setting (e.g., by exclusive-ORing multiple bits together to produce the final configuration setting). This type of redundancy has limited flexibility, however, and requires additional fuses which take up additional real estate on the IC. In addition, having multiple fuses behind a setting does not remove the need to perform multiple programming steps to configure ICs adds cost. Likewise, configurations today continue to be performed by IC vendors (or their contractors), who then maintain inventories of ICs with multiple fuse configurations.

The stockpiling of the different varieties of the same IC is often inefficient. For example, stockpiled ICs configured for a particular application are potentially wasted if they were overproduced or if customers' IC configuration needs change. Additionally, in some cases order fulfillment can be delayed if inventory of the configured ICs is insufficient to meet the demand. Moreover, the present model of configuration by the IC vendor can limit the range of business relationships and revenue streams practical between IC vendors and downstream customers. For example, the present model may limit the ability to generate future revenue from reconfiguration of ICs after their initial sale. If a downstream customer wishes to obtain features beyond the configured feature set, current ICs typically lack means for unlocking this functionality and there is therefore no opportunity to use downstream feature enablement as a revenue stream.

Moreover, the need for secure systems and applications is growing. Presently, allegedly secure ICs are often programmed with security keys on the factory floor. Secure keys may be used in a variety of ways, such as, for example, to protect stored data, control access to digital content, or encrypt/authenticate data used in transactions. Today, these keys can be stored in a one-time programmable memory, which may hold keys directly or hold a base key that is used with cryptographic functions to generate derivative keys for various functions. Typically, security is provided by performing the key loading process in a secured facility.

BRIEF DESCRIPTION OF THE DRAWINGS

The present disclosure is illustrated by way of example, and not by way of limitation, in the figures of the accompanying drawings.

DETAILED DESCRIPTION

Figure 1:
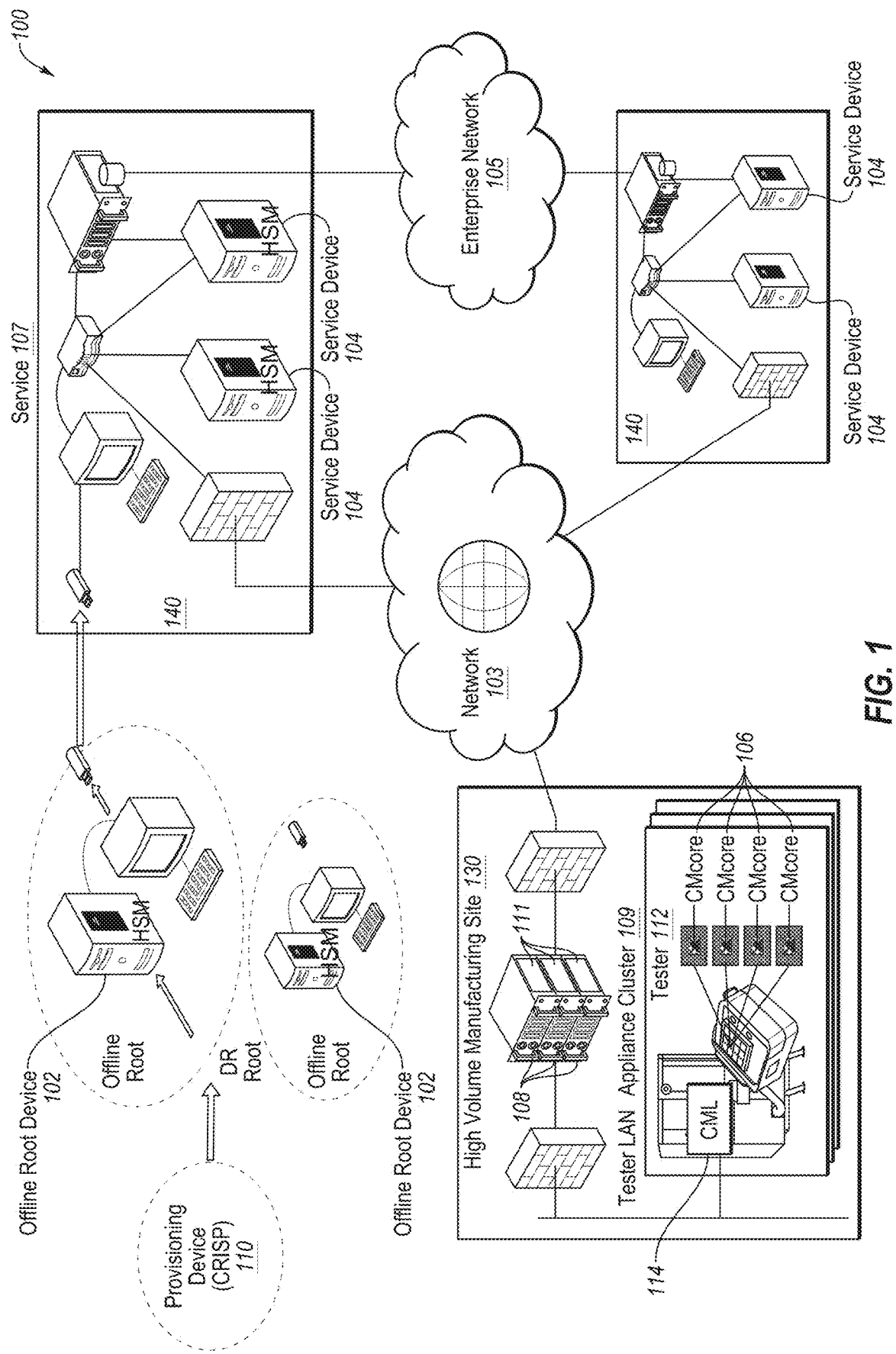
FIG. 1 illustrates a network diagram of a Cryptographic Manager (CM) system according to one embodiment.

The embodiments described herein describe technologies of a secure asset management infrastructure for providing secure assets to target devices in one or more stages of manufacturing lifecycle of target devices. The secure asset management infrastructure (also referred to as CM Ecosystem) includes a multi-device cryptographic manager (CM) system of hardware and software designed to fulfill use cases of providing secure chip manufacturing (hereinafter referred to as "CM system"). The CM system includes various authorizing, customizing, and testing subsystems and other processed aimed a secure device manufacturing. The CM system securely generates, processes, and delivers the payloads (Sequences). It typically includes a CM Root device (referred to herein as "Root device" or "CM Root device"), one or more CM Service Appliance devices (referred to herein as "Service device" or "CM Service device"), a number of CM Appliance devices (referred to herein as "Appliance devices" or "CM Appliance devices), Tester devices, and a number of CM Cores and related software. A CM Appliance in this CM ecosystem is a product that securely generates, processes, and delivers payloads (also referred to as sequences or Module sequences) to a CM Core of a target device. The CM Core is a hardware core capable of executing a set of commands, which are the building blocks for delivering functionality to the target device (also referred to as a Product). The result of execution of these commands is the goal of the CM System. Sequences may be digitally signed and/or carry other cryptographic demonstrations of validity (e.g. a MAC), which the CM Core can verify to confirm the original and validity of the sequences. This provides control over what data will be accepted (and which operations will be executed by) the CM Core, even if the communication channel used to deliver the sequences is untrusted. In one embodiment, the CM Cores are CryptoManager™ cores. The CryptoManager™ core is a hardware core that provides cryptographic control of feature activation, configuration management, and secure key management. The CryptoManager™ core is integrated into System on Chip (SoC) designs and is accessed via a register interface located on the SoC main bus. The Module is a program, containing both the instructions and the data, execution of which results in a secure construction of a Sequence. The Sequence may be binary data produced by a Module that is running on an HSM within a Delegate Appliance device and consumed by the CM Core. Secure execution of a Sequence by a CM Core is the main objective of the CM System. The exact instruction set of a Module may be defined as a part of the CM system design.

The manufacturing and assembly of electronic devices and other devices containing electronic components, such as microcontroller, sensors, process, etc., have increased along with the increasing usage of such hardware devices. In effort to reduce the costs of manufacturing, many companies have outsourced aspects of the manufacturing process to third-party companies. Some of these third-party companies may be overseas and may be in jurisdictions in which corporate security is not as robust as in other jurisdictions.

In the manufacturing of certain devices, software, codes, keys and other important assets may be embedded or installed in the hardware devices. Currently, these assets may be transported from the customer to a manufacturing site on a storage medium, such as stored on an optical disc. The management of these assets may be important to the security and revenues of the customer as it not entirely satisfactory in all respects. The embodiments described herein provide secure-asset management systems and technologies to securely provision assets to these hardware devices in untrusted environments. The secure-asset management system includes many components that cooperate to allow a customer to monitor and control the receipt and consumption of such assets during the manufacturing process performed by the third-party manufacturer. The system includes remote components installed at the third-party manufacturer and components used by the customer to communicate with and control these remote components. An asset may be digital data, such as a key or key set, a certificate, a unique device identifier, etc. which needs to be securely transferred to the consuming device before the device may be ready for sale to a consumer.

FIG. 1 illustrates a network diagram of a CM system 100 according to one embodiment. The CM system 100 typically includes a variety of cryptographic manager (CM) devices. The CM system 100 may provide secure transaction processing and data reporting infrastructure designed to provide secure key and asset management capabilities to a target device 106 (e.g., mobile devices) through a web service interface. The user or customer for the CM system 100 may be fabless semiconductor vendors that produce chipsets for mobile devices, system integrators (OEMs) that manufacture mobile internet connected devices, and mobile network operators (MNOs) that deploy these devices on their wireless networks, etc. Such customers may contract out some of the fabrication of their devices or components to third-party manufacturers that operating remote manufacturing facilities, such as a high-volume manufacturing site 130. As a mission critical part of the customer's manufacturing and communications systems, design priorities for the CM system 100 are high availability and integrity.

Figure 2:
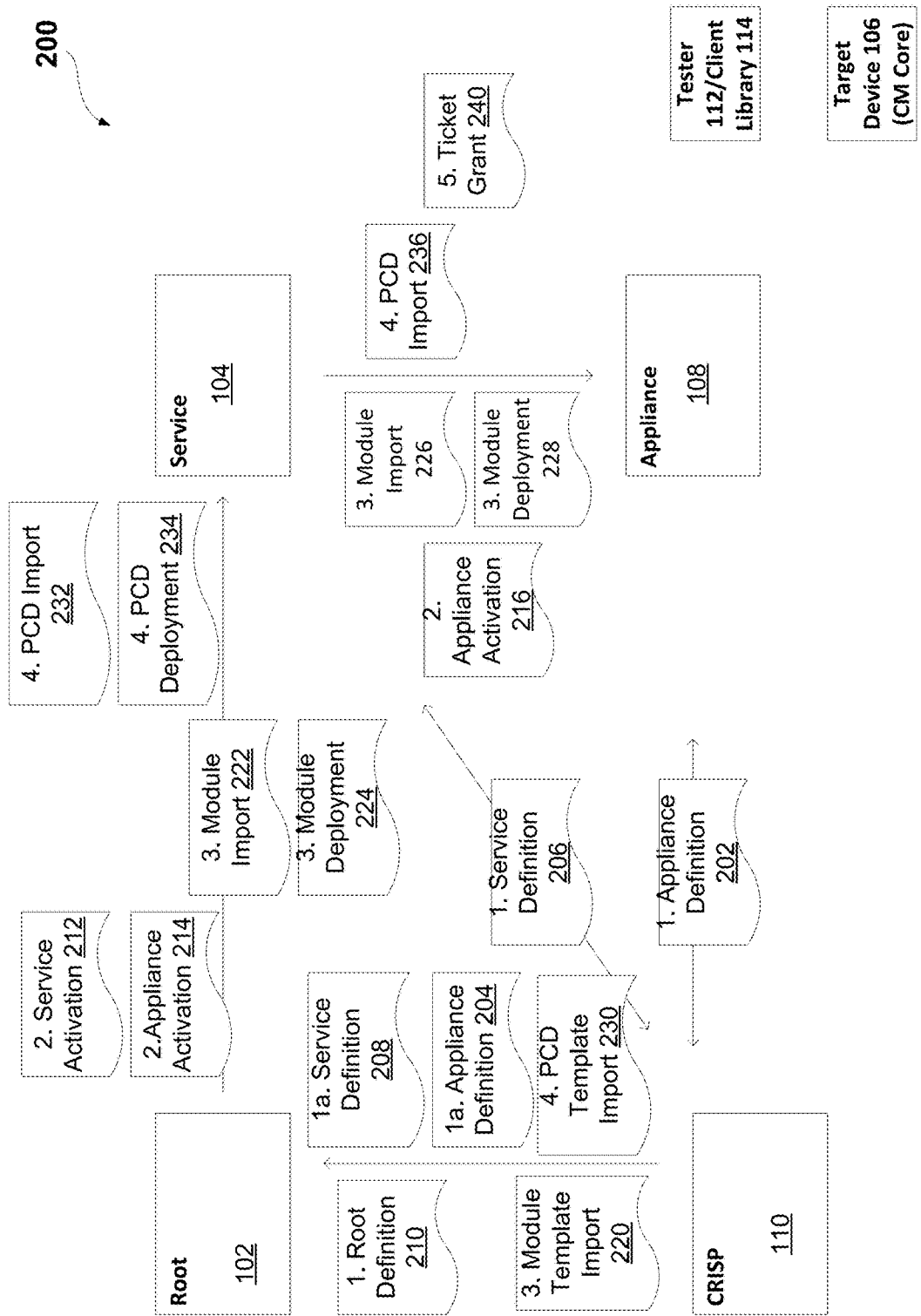
FIG. 2 is a diagram illustrating messages between devices of the CM system of FIG. 1 according to one embodiment.

The CM system 100 includes a provisioning device 110 that acts as an initial provisioning facility for devices and Modules, which may be part of or used in the CM system 100 to the devices' initial identities and credentials. A Root device 102 receives data signed by the provisioning device 110, such as illustrated in FIG. 2. The Root device 102 is an entity which authorizes installation, configuration, and operation of the CM System 100. The Root device 102 may protect master keys and authorize the setup, installation, configuration, and operation of components of the CM system 100 in any given site, such as manufacturing site 130. For security reasons, the provisioning device 110 may not have a persistent connection to the rest of the CM system 100 in some embodiments. That is, the Root device 102 may be considered an offline Root that authorizes setup and major configuration parameters in the operation of the CM System. Typically, data is transferred to and from the Root device 102 by a removable storage device, such as a Universal Serial Bus (USB) Flash drive or the like. Computer systems are subject to trade-offs between security and convenience. Given that the main task of the Root Authority is to protect master keys that underpin security of an entire CM deployment, the Root Authority design is driven by the need for security. This is why the Root Authority may be air-gapped (i.e., not connected to any computer network). Additionally, a HSM may be used to protect most important keys stored by the Root Authority. Because the Root Authority is offline, it is not assumed to be continuously available. As a result, the Root Authority may authorize a range of permitted actions in advance so that it is not necessary to involve the Root Authority when an action needs to be taken. The Root Authority's authorizations are provided to the Service device, where decisions are made about which authorizations will actually be used.

A Service 107 (hereinafter "Service"), including one or more Service devices 104, provides a way to centrally control and monitor operation of the CM system 100, as well as provision data to an Appliance cluster 109 (a collection of one or more Appliance devices). The Service device 104 is a hardware appliance used to facilitate central management of the CM System 100 and to provision data to an Appliance cluster 109. Additionally, it distributes (via Delegate Appliance devices 108) Modules, data and security parameters destined for target devices 106. A target device 106 is monolithic integrated circuit, usually containing a CM Core. The Service devices 104 of the Service 107 may reside in the customer's physically secure corporate data center 140 and may provide a turn-key security service to the company to manage its assets in a remote manufacturing site 130. In another embodiment, the Service 107 may include multiple Service devices 104 at multiple data centers 140 connected over an enterprise network 105, as illustrated in FIG. 1. An asset is a digital data file, such as an HDCP Device Key Set, which needs to be securely transferred to a target consuming device (e.g. CM Core). An asset is any sensitive data such as keys, serial numbers, and firmware that are managed securely through the CM system and provisioned to devices at various lifecycle stages from manufacturing supply chain to the end user. Assets are usually device-specific. For example, perso1, perso2, and device serialization records are assets. Digital Content Protection, LLC (DCP) is an organization that creates and sells HDCP keys. For example, a customer buys their keys from DCP, and then imports HDCP keys into the CM Service. The import process reformats the key file as a pre-computed (PCD) file and encrypts it so that only suitably authorized Appliance devices can access the PCD. The Appliance cluster 109 is responsible for locally hosting sensitive data to be transferred to the target devices 106 (e.g., CM Cores) during the process of manufacturing the target devices 106 at the manufacturing site 130.

The capability to manage the distribution network of Appliance clusters 109 and to provision PCD assets, ticket authorizations, signed sequences, and Modules across a network 103 of security Appliance devices 108 may be provided by a web service interface to users of the CM system 100. The Appliance cluster 109 may be responsible for securely storing sensitive data locally in the manufacturing facility site 130 and for making that data highly available in a low latency manner to a target device 106, such as a system-on-a-chip (SoC) or a subcomponent on such an SoC, during the process of semiconductor device test and/or manufacturing. The target device 106 may be integrated into the SoC design during the design phase of the SoC to provide cryptographic control of SoC feature activation, configuration management, and secure key management. In some embodiments, the target devices 106 each include a CM Core. The CM Core is a hardware core capable of executing a set of commands, which are the building blocks for delivering functionality to a product (target device 106). The result of execution of these commands is the ultimate goal of the CM System 100. A Delegate is an entity to which Root device 102 grants a subset of CM Core programming capabilities, allowing incorporation of data unknown to the Root device 102 into sequences destined for target devices 106 (e.g., CM Cores). An Appliance device 108 is a server designed to provide secure computation, digital signing and distribution of Sequences to target devices 106 (e.g., CM Cores) incorporating the data provided by the Delegate entity. Appliance devices 108 each contain a hardware security module (HSM) 111, which serves both as a vault safeguarding sensitive data and as a platform for execution of a Module. Additionally, Appliance devices 108 generates, collects, protects, digitally signs and sends a variety of logging information to the customer via the Service 107. The Appliance cluster 109 (also referred to as delegate cluster) is a group of Delegate Appliance devices 108 providing increased availability of the services offered by a Delegate Appliance device 108. If a particular Appliance device 108 is unable to fulfill a request, a Tester device 112 can connect to any other Appliance device 108 in the same Appliance cluster 109 to continue service without major interruption. Tester device 112 is a machine used in semiconductor device fabrication to test that devices perform properly. The CM System uses Tester devices 112 to program data during wafer sort and package test. A Tester device 112 is generally an untrusted device, located at the manufacturer's site 130, used to deliver Sequences to the specific target devices 106 (e.g., CM Cores). The Tester device 112 is a device designed to perform validation, characterization, and high-volume manufacturing tests. Tester device 112 runs a series of semiconductor tests, one or several of which will be a part of the CM System operation. The Tester device 112 is relied on to initiate the communications with the Delegate Appliance cluster 109 and to provide logging information. A Sequence is binary data produced by a Module running on an HSM 111 within a Delegate Appliance device 108 and consumed by the CM Core. Secure execution of a Sequence by a CM Core is the main objective of the CM System 100. The Tester device 112 can access a client library 114. The client library 114 may be a software component to be integrated with a primary application of the Tester device 112. The client library 114 may be the client library provided by Cryptography Research Inc. Described herein are typical interactions initiated by a Tester device 112 in a CM System 100 containing CM Cores. In other embodiments, in a non-CM Core system, interactions by the Tester device 112 maybe slightly different. When a Tester device 112 runs a "CRI" test, the Tester device 112 may invoke a script, which sends a request to one of the Appliance devices 108. In response, the Appliance device 108 performs a protocol described herein in which results in a secure delivery of a Sequence to one or more CM Cores used in a given test.

To make the data available to the target device 106, the Appliance cluster 109 may be connected to the asset management service, called Service 107, over a network 103, such as the public internet, a private network, and/or combinations thereof. The Appliance cluster 109 may reside in a data center of the outsourced manufacturing facility site 130 and may act as a proxy to the Service 107. The Appliance clusters 109 make available a secure and highly available local inventory of PCD assets and ticket authorizations during manufacture to target devices 106 (e.g., mobile devices and chipsets) using strong authentication and access control in a low latency manner.

The provisions and/or installation of an asset to a device may be referred to as an asset-management transaction. Asset-management transactions may be managed by a Module. A single Appliance cluster 109 may run many Modules and each Module may be designed to provide a single type of transaction to the CM Core enabled target device. The security sensitive computations needed by the Module are performed on a HSM 111. A Module, along with the tamper-proof HSM 111, may consume a target device specific authorization, or ticket, from a bulk authorization file provisioned by the Service 107 to the Appliance device 108 or Appliance cluster 109. A Module is a program, containing both the instructions and the data, execution of which results in a secure construction of a Sequence. Exact instruction set of a Module is defined as a part of the CM system design. A Module Template is a program, which defines the set of instructions of the Module. Module Template is imported by Root device 102 and its execution results in a creation of a Module. Module Templates provide a mechanism for CM System extensibility. PCD, as described herein, is data distributed by the Delegate Appliance device, typically computed offline, sent to a Delegate Appliance device in bulk, indexed by an index, and transferred as a part of a Sequence. The index may be independent of the serial number or other identifier of the target device. A PCD Template is a description of how the PCD, which becomes an input for a particular type of Module, is formatted. A PCD type is a set of PCD based on a particular PCD Template, having a particular property, such as uniqueness, serialization, etc. For example, PCD includes CM root-generated keys, serial numbers etc. that are securely packaged such that only the CM Core IP on a device can provision the data. For another example, the PCD includes keys from various vendors (for example, HDCP keys) securely managed from the CM Service to the target device. Key data are transformed into PCD on loading into the Service.

All assets within a given PCD Type are indexed by Tickets with the same Ticket Name. A Ticket is data that enables enforcement of usage count limits and uniqueness/sequential issuance of CM Core parameters. Tickets are authorized by the Service operator and consumed by the CM Module. Modules, PCD assets, and tickets are described in more detail below.

In general, CM devices (e.g., 102, 104, and 108) must be trusted in order to provide the security foundation needed to manage, distribute, and program valuable electronic assets on behalf of CRT customers (or customer of a Root Authority entity). Establishing a root of trust across the CM System 100 that can be used for the authentication of all devices is central to the overall security model of the CM infrastructure. In order to solve the problem of securely establishing and provisioning secure identifiers and credentials, a provisioning device 110 also referred to as CRISP or CRISP device) can be used. CRISP can be used at a starting point in a lifecycle of any CM Device. Before CRISP can provision any new CM Device, CRISP first creates its own credentials and establishes itself as a Trusted Third Party to both an entity providing assets (e.g., Cryptograph Research Inc.) and its customers distributing the assets to CM devices in manufacturing. CRISP provides the ability to switch the CM system 100 from using CRT-issued keys (e.g., keys provided by Cryptography Research Inc.) to operate using customer-specific keys, which are typically generated by a Root Authority (RA).

It should be noted that various portions of the description refer to components of the CM system 100, such as Root, Service, or Appliance as logical entities. Sometimes the internal structure of a logical entity is important. For example, a Service entity typically includes two servers, a shared file system, a shared database, or the like. In the contexts where internals of Service 107 are important and each of these servers is viewed as a logical entity, each of them is referred to as Service device, to distinguish it from the Service entity (which represents Service devices as well as shared resources). Similarly, a Root device 102 is a server implementing the functionality of the Root Authority; an Appliance device is a single server (typically a member of the Appliance cluster 109 of Appliance devices 108). A Target Device 106, typically a CM Core of the target device, is the consumer of the functionality of the CM System 100. Root Devices 102, Service devices 104, and Appliance devices 108 each include a main computing device (e.g., processor or the like) as well as an embedded HSM 111. Some of the IDs and keys will be stored inside the HSM 111, while others will be stored on the device's hard drive. Exact location of the IDs or keys is determined based on their sensitivity and the implementation details as described herein. IDs are used to identify components within the CM System 100. Some of the components are entities (e.g. Service 107), while others are devices (e.g. Service device 104). Also, as used herein, Chip Series refers to a set of Products sharing the same security parameters within CM Cores (e.g., a set of Products sharing a common set of attributes, e.g. RsbSigningKey). This concept is also reflected by the Root Authority's data model. Each set of security parameters is encapsulated in the distinct ChipSeries dataset on the Root Authority. ChipSeriesID is an identifier of a ChipSeries. ChipSeriesName or alias is a code-name used by a customer for a ChipSeries. A product is a collection of devices sharing a common set of attributes, e.g. deviceID space. DeviceID is an identifier of a target device. Product Name or product alias may be a code named used by a customer for a Product. ChipID is an ID of a product, not an identifier of a chip, core, or device.

A provisioning system, such as the Cryptography Research Inc. (CRI system provisioning) CRISP entity, may include one or more provisioning devices 110 (labeled CRISP device 110 in FIG. 1). CRISP device 110 acts as an initial key provisioning authority for all devices and Modules in the CM system 100, which provides the devices' activation identities and credentials. In particular, the Root devices 102 receives data signed by the provisioning device 110, such as illustrated in FIG. 2: Appliance Definition Files, which specify the attributes of Appliance devices and their HSMs 111; Service Definition Files, which specify the attributes of Service devices and their HSMs; Module Templates, PCD Templates, ChipSeries Templates or the like.

Information about all devices of the CM system 100, specifically their IDs and their keys, will be passed by CRISP device 110 to the Root Authority (Root device 102). This data serve as a basis for the authorizations by the Root Authority. For instance, when activating a new Service 107, a Root operator chooses the Service device 104 from the list of all Service devices 104 known to Root Authority to establish a new Service. It should be noted that, in certain situations, it may be possible for the Root Authority to import devices, Modules, or other data that CRISP device 110 has not authorized. Although the CM system 100 can function in a meaningful way, the import of such may introduce untrusted elements and can have severe security and reliability consequences.

FIG. 2 is a diagram illustrating messages between devices of the CM system 100 of FIG. 1 according to one embodiment. FIG. 2 illustrates a high-level overview of the CM System messaging 200. These messages provide a visual representation of the messages in CM System 100. They can be logically divided into the following groups of functionality: Definitions; Activations; Module distribution; PCD distribution; and Tickets distribution that roughly correspond to the CM Ecosystem lifecycle stages described above. Operations can also be subdivided into several specific stages: Module; PCD; and Tickets distribution. It should be noted that each numbered message may actually represent several messages, but has been represented to illustrate message exchanges in general. Also, messages, depicted in FIG. 2 may contain several parts. The message and associated functionality required to generate and process each message are described herein.

The partitioning of the messages is due to two factors: encoding needs for messages targeted at devices 106 and HSMs 111 and file signatures. For HSM-targeted files, HSMs typically process input data which is encoded in binary format. Thus, data, targeted for the HSMs 111 shall be encoded in that way. For Device-targeted files, data to be processed by Service device or Appliance device may be encoded using JSON for simplicity of processing. In order to avoid making HSMs 111 parse JSON objects, messages can be split into these two types: binary or JSON. One of the features of HSM 111 is the backup-restore mechanism, which uses Master Backup Key (MBK). Moreover, in order to operate, an HSM 111 has to have an MBK stored in it. MBK is treated differently on Root, Service and Appliance devices. On Root device 102, MBK is used as planned, for backup/restore operations. On Service device 104 and Appliance device 108, MBK may not be used and the MBK can be generated and stored on the HSM 111.

For Definitions, as described above, CRISP device's 110 role is to provide the initial authentication of device identities and credentials. CRISP device 110 creates and distributes credentials, which are used for establishing mutually authenticated Secure Shell (SSH) tunnels between Service devices 104 and Appliance devices 108, prior to them being activated. Additionally, CRISP device 110 serves as a distributor of authenticated public information about devices to Root Authority and on to other devices. For instance, ApplianceActivationConn key pair is used to provide Appliance credentials for SSH authentication. This key pair is generated on an Appliance device 108 and its public key is sent to CRISP device 110 during definition in an Appliance definition message 202. As a part of Appliance definition, Root device 102 receives this public key (along with other public keys of this and other kinds) in an Appliance definition message 202 from CRISP 210. This public key is distributed to the Service device 104 which can use them to securely communicate with Appliance devices 108. Additional definition messages can be used for definition of other devices. For example, a service definition message 204 can be received by CRISP device 110 from Service device 104. As part of Service definition, Root device 102 receives this public key (along with other public keys of this and other kinds) in a Service definition message 208 from CRISP. Also, as part of Root definition, the Root device 102 can receive a root definition message 210 from CRISP device 110.

Another important part of the definition is providing device nonces, one-time-use passwords shared between Root device 102 and each of the devices (both Service devices 104 and Appliance devices 108), which allow authentication of activation messages and delivering encrypted data during activation. More broadly, definition is a process of exchanging data between each of the devices and CRISP device 110, which uses physical proximity for its security, which is leveraged during activation to bootstrap security.

One of the main functions of the Root Authority is to provide authorizations to the rest of the CM System 100. For activation, the devices of CM system 100 can exchange activation files via activation messages. This may be done by transferring signed files using removable storage devices (e.g., USB Flash drives). Each authorization includes several files, some of which come in pairs: one contents file and one signature or hash file. When authorization needs to be delivered to the device itself (not the HSM 111), the message contents are typically expressed in JSON format, while binary format is used for authorizations targeted to the HSM 111. All this means that a typical authorization is a TAR file, containing several files. As illustrated in FIG. 2, the Service device 104 receives a service activation message 212 and appliance activation message 214 from the Root device 102. The Appliance device 108 may receive the appliance activation message 216 from the Service device 104.

Infrastructure Configuration includes a set of authorizations provided by the Root device 102 to the Service device in a form of a series of signed files. These files are processed by the Service device 104 and some of them are sent further to the Appliance devices 108. For example, before an Appliance device 108 can perform any useful function as a part of the CM System 100 (other than being upgraded), the Appliance device 108 needs to be activated. In order to do so, Root device 102 creates and signs the appliance activation message 214 and sends it to the Service device 104. The transfer of this message constitutes the activation authorization. From the Root device's perspective, this Appliance activation has been issued, but it may not have any effect on the Appliance device 108 itself for a long time. It is only when the Service operator decides to act on the provided authorization and forwards received authorization, it may have a chance to take effect. After receiving this appliance activation message 216 from the Service device 104, the Appliance device 108 verifies the signatures on it and applies the Activation authorization, only then it can reach active state. It should be noted that a part of the Appliance activation authorization may be processed by the Service device 104 itself. For example, this is how the Service device 104 receives SSH credentials it needs to use to connect to the Appliance device 108 when activating it. As described above, the Root Authority may authorize a range of permitted actions in advance so that it is not necessary to involve the Root Authority when an action needs to be taken. The Root Authority's authorizations (214, 216) are provided to the Service device 104, where decisions are made about which authorizations will actually be used.

As illustrated in FIG. 2, messages are used to securely exchange information about Modules, PCD and tickets between devices in the CM system. For example, Root device 102 receives a Module Template import message 220 to import a Module Template into Root device 102 and a PCD Template import message 230 to import a PCD Template into Root device 102. Modules, Module Templates and PCD Templates are described in more detail below. The Service device 104 receives a Module import message 222 to import a Module into Service device 104 and a Module deployment message 224 to deploy a Module to an Appliance device 108. The Service device 104 receives a PCD import message 232 to import a PCD into Service device 104 and a PCD deployment message 234 to deploy a PCD to an Appliance device 108. The Appliance device 108 receives a Module import message 226 to import a Module into Appliance device 108 and a Module deployment message 228 to deploy a Module to a target device 106. The Appliance device 108 receives a PCD import message 236 to import a PCD into Appliance device 108. The PCD can be deployed to the target device 106 in connection with the Module deployed to the target device 106. It should be noted that PCD is used to provide data input to the Modules. In general, there are two major inputs to the Module, including PCD and Tickets. For example, in order to transfer keys to a CM Core of a target device 106, the keys are provided in the form of PCD, which is consumed by the Module when it is executed in response to a request from a Tester device 112. PCD is a general reference to PCD-related information as described herein.

The Service device 104 and Appliance device 108 can exchange ticketing messages 240. In particular, the Appliance device 108 receives ticket grant message 240 from the Service device 104. The ticket, in the form of PCD, is an input to the Module when executed on the target device 106. Additional details regarding ticketing are described below.

One of the features of the CM System 100 is a command interpreter running on a Delegate Appliance device 108 which executes sequences of commands. There are basically two types of commands in a sequence, one type cryptographically signed by a Root authority, another type cryptographically signed by a Delegate, such as Service device 104. These sequences provide secure and authenticated programming instructions to the target device 106 (e.g., CM Core).

Modules

A Module is a program, containing the instructions and the data, execution of which results in a secure construction of a Sequence. A Sequence, in turn, is defined as the binary output of a Module consumed by a CM Core of the target device 106. Secure transmission of a Sequence to the CM Core and its subsequent execution is the main objective of the CM System 100. In other words, Module encapsulates a piece of distinct functionality provided by the CM System 100. Execution of a Module on a Delegate Appliance device delivers the utility provided by the CM System 100 in a form of an interaction with the ultimate consumer device, typically a CM Core.

In general, a Module is an application that provisions data securely to a target device. Modules originate in the Root Authority where they are authorized to run on a specific Appliance cluster at a specific manufacturing site. A Module may process encrypted assets in the form of PCD assets from inventory on an Appliance cluster into a device-unique, non-replayable message. Some Modules do not have PCD and some Modules do not have unique messages. Modules use a ticketing system to ensure assets are not duplicated or double-spent. Modules contain information that is written to a device by a Tester device that invokes a Module using the Client Library during the manufacturing process; for example, during wafer sort or final test. Most Modules also securely log device transactions on the Appliance device. The log entry includes tracking data such as the deviceId and key identifier. The ticketing system tracks Module usage and may require an inventory to ensure that each time a Tester device writes to a device, the payload is unique to that device and prevents replay or double spending. The Appliance device may already include an inventory of a specified number of PCD and tickets for each Module. Modules can be deployed by the Service operators to selected Appliance clusters, but may require an authorization from Root first. The Service then maintains inventory of PCD and tickets required by each Module at each Appliance cluster, at sufficient levels to cover the production rate with allowance for network connection failure or bandwidth fluctuations.

Modules offer flexibility and extensibility to the CM System architecture. New Modules may be developed, tested, and deployed on a functioning CM System 100, while it's supporting production using previously deployed Modules. Module lifecycle is somewhat complex, which is a reflection of the system requirements, which call for an extensible mechanism to provide yet unknown features to the functioning system, while not sacrificing any of the system security. The following description provides various embodiments of Module management through a Module lifecycle.

Figure 3:
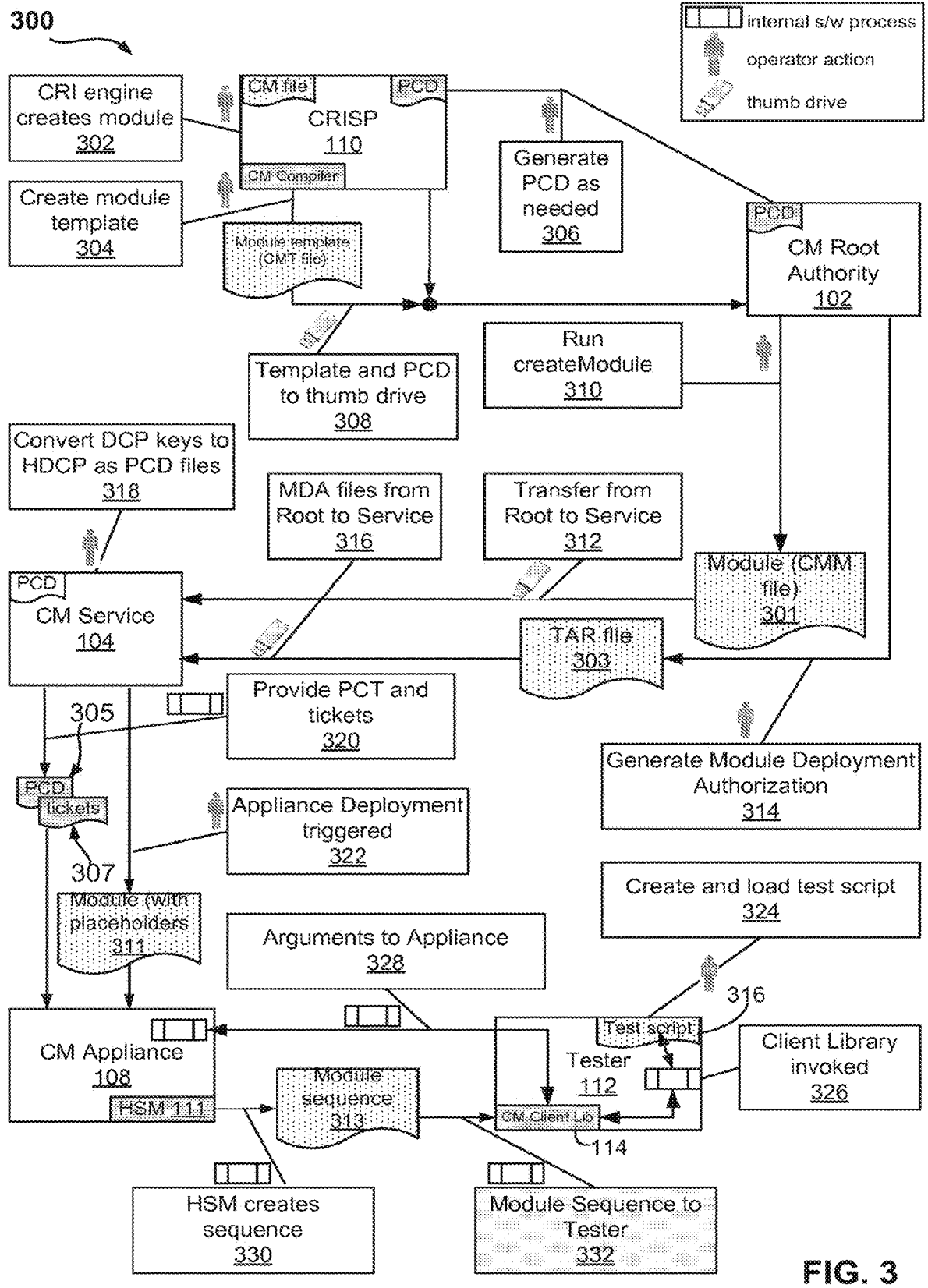
FIG. 3 is a flow diagram illustrating a Module lifecycle according to one embodiment.

FIG. 3 is a flow diagram illustrating a Module lifecycle 300 according to one embodiment. At 302, a CRISP operator creates a Module specification file (CM file). At 304, the CRISP operator uses a CRISP command line interface (CLI), or other user interface, to run a command (e.g., the cmCompiler command) to create a Module Template (CMT file). The CM file is used as input by the CM Compiler. At 306, operators (CRISP operator and Root operator) use the CRISP CLI and a Root CLI to generate PCD as needed. At 308, the Module Template and PCD Template are transferred from CRISP to Root via thumb drive (or other removable storage device as described herein). At 310, at the Root CLI, Root Operator runs a command (e.g., the createModule command) to create a Module. In one embodiment, for a Module M1, a softHSM creates the Module and HSM signs the Module. Modules contain or use some or all of the following: PCD 305 (from CRISP and/or Root); Keys (encrypted) from the Root database; Arguments supplied by the Root Operator; "Placeholders" 311 for data that the Appliance device 108 later provides. It should be noted that, in this exemplary embodiment, the Module does not contain PCD, but the Module may require that PCD be present on the Appliance. Arguments to a Module provided by Root operators may be specific feature bits for a feature management Module. They may include memory offsets that determine where the resulting keys are stored, for example. At 312, the Module with placeholders 311 is transferred from Root device 102 to Service device 104 via a thumb drive. At 314, at the Root CLI, the Root Operator runs a command (createModuleDeploymentAuthorization command) to generate a Module Deployment Authorization. At 316, Module Authorization files are transferred from Root device 102 to Service 104 via a thumb drive. At 318, a Service operator uploads a High-bandwidth Digital Content Protection (HDCP) key file (from DCP) for HDCP Modules. The Service operator requests that the Service device 104 convert the DCP keys to HDCP encrypted keys formatted as PCD files. At 320, the Service device 104 provides PCD 305 and tickets 307 to the Appliance device 108. The Service device 104 can continually grant tickets to the Appliance device 108 to give the Appliance device 108 permission to execute a Module. The Service device 104 can query Appliance device 108 to determine inventory status, and can send PCD to Appliance device 108 when inventory falls below a configured limit. At 322, the Module is deployed over the network to the Appliance device 108. In this embodiment, a deployment command (loadModule command) may be triggered when the Service Operator uses the user interface (GUI or CLI), adds an Appliance device 108 to an Appliance cluster 109 (not illustrated in FIG. 3), and deploys a Module to the new Appliance device 108.

At 324, using the Tester CLI, a Test Method Developer creates a test script 315 (e.g., lot_test) and loads it onto the Tester device 112. At 326, the test script 315 triggers the Client Library 114 to Appliance device 108 communications, which invokes the Module. At 328, the client library 114 sends arguments to the Appliance device 108, which the Appliance device 108 uses, along with PCD 305, to produce a Module sequence 313 to send to the Tester device 112. At 330, the HSM 111 of Appliance device 108 assembles PCD 305 and tester info, signs delegate signing blocks (DSBs), and creates the Module sequence 313. At 332, the Appliance device 108 sends the Module sequence 313 to the Client Library 114 for the Tester device 112 to send to the CM Core.

In one embodiment, the Root device receives a Module Template, PCD Template, and user input including arguments associated with a specific transaction type of multiple types. A Module is generated based on the Module Template, the pre-computed data and the arguments and deployed to an Appliance device. The Module, when executed on the Appliance device, results in a secure construction of a sequence of operations to be performed as a transaction of the specific transaction type with respect to a target device (e.g., CM Core).

In some embodiments, Modules are produced by the Root Authority based on the Module Template. Module Templates may be distributed by CRISP device 110 through a mechanism similar to distribution of the device definitions. Module Templates essentially define a type of a Module, based on the use-case the Module needs to support. Use Cases that are to be run at the same production stage as a single set of interactions between Appliance device and CM Core can use a Module Template that combines sets of desired functionality. Based on this Module Template, a Module for a particular chipSeries dataset would be created on the Root device 102. This Module, along with the Module Deployment message would be distributed to the Appliance clusters to perform the interaction with the CM Core to provide combined data to the target device.

Module Management can be divided into two distinct pieces of CM System functionality: Module Import and Module Deployment. At a high level, Module Import is what an Appliance device is required to perform before it can load a Module into its HSM and use it to service Tester device requests. However, if Module Deployment message is not received and processed for a particular Module, it will not be able to perform its function. Module Deployment message delivers a module key (moduleKey), which is used to encrypt sensitive information inside the Module. Additionally, Module Deployment message ties a Module to a specific cluster. The Module can be named according to a convention, such as with a compound descriptor including a description of the Module functionality (the same as the Module Template name), a Module domain, a reference to the Module Template parameters, and a version. For example, the name of a Module that provides serialization, cvdak (ChipVendorDeviceAesKey) and padak (ProvisioningAuthorityDeviceAesKey) programming functionality for a product in development mode would be: srl_cvdak_padak_productname_dev_01, where the last parameter is the version, which technically is not a part of the name, but usually accompanies it. Module Template parameters may be provided during Module creation and may be given a reference (handle). These references become part of the name of the Module. For example, srl_cvdak_padak Module Template requires a development mode. Module Template encodes that requirement and Root CLI prompts the Root operator to enter the mode as well as the reference (alias) for the choice. This reference will be used to identify the Module. For example in the Module named srl_cvdak_padak_productname_dev_01, "dev" is the reference to the Module Template parameters.

Module is produced by the Root device 102 by turning a Module Template into a Module. Module Template is itself a Module. That is, Module Template is a program that runs on the HSM interpreter inside the Root device 102. The result of its execution is another Module. Module Template defines the generic functionality that will be performed by the Module in response to a request from the Tester device 112. For instance, a Module Template can be created to perform serialization, provisioning of serial numbers into CM Cores, or the like. However, some specific information about the CM Cores may be required to construct Modules to perform serialization. The Module Template can be run by an interpreter on the Root HSM to produce a Module.

In one embodiment, the Module is transferred between the Root devices 102, Service devices 104, and Appliance devices 108 in a TAR archive 303. Service device 104 may save a particular Module and use it over again with different Module Deployment authorizations to deploy it on different Appliance clusters. Module by itself is deployment-neutral, in other words, it can be deployed on any Appliance cluster. Module Deployment message is what binds the Module to an Appliance cluster, which includes providing the moduleKey, encrypted with the clusterKey, to be delivered to the Appliance/HSM. The Appliance device verifies the signature on a Module deployment message, checking whether the Appliance device belongs to the Application cluster specified in the message and passes it to the HSM, where the moduleKey is unwrapped and stored.

In one embodiment, the Root device 102 includes a processor and a removable storage device interface configured to connect to a removable storage device. The processor is operable to receive a command to create a Module. In response to the command, the processor executes a Module Template to generate the Module. The processor deploys the Module to an Appliance device, e.g., by storing the Module to the removable storage device. In particular, the processor stores the Module in the removable storage device via the removable storage device interface to transfer the Module to a Service device and the Service device is configured to distribute the Module over a network to the Appliance device. In some embodiments, the processor can generate the Module with PCD, key, input from an operator (e.g., an argument associated with a specific transaction type), or any combination thereof. In another embodiment, the processor can generate the Module with a placeholder for data to be provided later as described herein. The processor can generate a Module deployment authorization and store the Module deployment authorization in the removable storage device to transfer the Module deployment authorization to a Service device that distributes the Module over a network to the Appliance device.

In one embodiment, the Appliance device 108 includes a processor, a network interface and a tester device interface coupled to the processor. The processor receives a Module over the network interface from a Service device and receives a communication over the tester device interface from a CM client library of a tester device. The CM Client Library is a set of functions that provides an interface from the Tester device to the CM Appliance cluster. In response to the communication, the processor invokes the Module to generate a Module sequence based on an argument in the communication. The processor sends the Module sequence to the CM client library to be run by the tester device to deliver the Module sequence to a CM Core of a target device in an operation phase of a manufacturing lifecycle of the target device. In a further embodiment, the Appliance device 108 includes a HSM that is operable to assemble tester information and PCD, sign a DSB, and create the Module sequence with the tester information, PCD and the DSB. In another embodiment, the tester device is configured to deliver the Module sequence to the CM Core of the target device as part of a test script.

Figure 4:
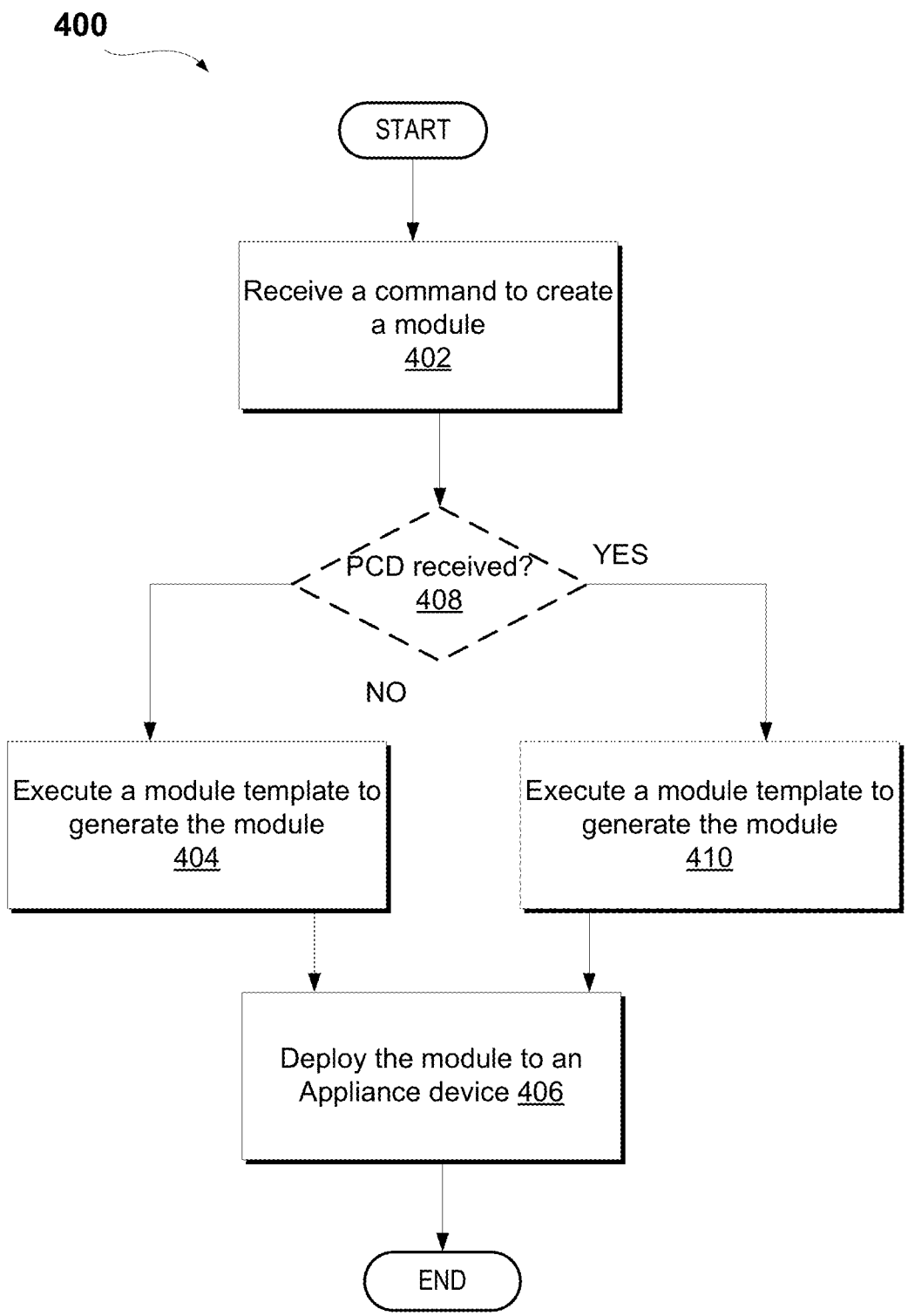
FIG. 4 is a flow diagram of a method of creating and deploying a Module to an Appliance device according to one embodiment.

FIG. 4 is a flow diagram of a method 400 of creating and deploying a Module to an Appliance device according to one embodiment. Method 400 may be performed by processing logic that may comprise hardware (e.g., circuitry, dedicated logic, programmable logic, microcode, etc.), software, firmware, or a combination thereof. In one implementation, Root device 102 of FIGS. 1-3 performs method 400. In other implementations, other components of the CM system 100 described herein may perform some or all of the operations of the method 400.

Referring to FIG. 4, the method 400 begins with processing logic receiving a command to create a Module (block 402). The Module is a first application that securely provisions a data asset to a target device 106 (CM Core of target device 106) in an operation phase of a manufacturing lifecycle of the target device. In response to the command, the processing logic executes a Module Template to generate the Module (block 404). The Module Template is a second application that defines a set of instructions for the Module and the data asset. The processing logic deploys the Module to an Appliance device (block 406), and the method 400 ends. The set of instructions of the Module, when executed by the Appliance device, results in a secure construction of a sequence of operations to securely provision the data asset to the target device. The Appliance device is configured to distribute the data asset to a cryptographic manager core of the target device.

In a further embodiment, the processing logic determines if pre-computed data (PCD) has been received (block 408), pre-computed data containing the data asset (block 408). When PCD has been received at block 408, the processing logic generates the Module with the PCD (block 410), and returns to block 406 to deploy the Module to the Appliance device. In another embodiment, the processing logic retrieves a key from a Root database and the processing logic generates the Module with the PCD and the key. In a further embodiment, the processing logic receives input from a Root operator, the input including arguments associated with a specific transaction type. The processing logic generates the Module with the PCD and the arguments. As described herein, the processing logic may generate the Module with a placeholder for data to be provided by the Appliance device.

As described herein, the processing logic may deploy the Module to the Appliance device by storing the Module in a removable storage device to transfer the Module to a Service device. The Service device is configured to distribute the Module over a network to the Appliance device.

In another embodiment, the processing logic generates a Module deployment authorization and stores the Module deployment authorization to a removable storage device to transfer the Module deployment authorization to a Service device and the Service device is configured to distribute the Module deployment authorization over a network to the Appliance device. In a further embodiment, the processing logic signs the Module with a root module private key.

Figure 5:
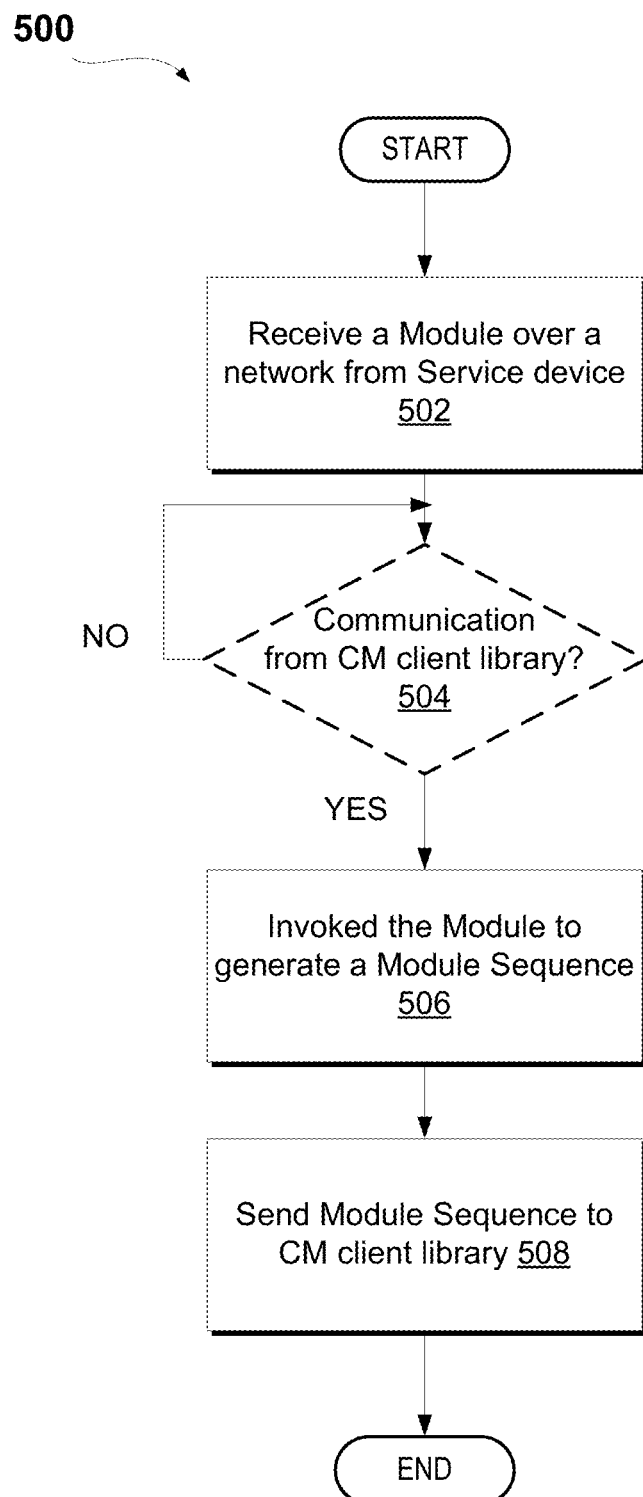
FIG. 5 is a flow diagram of a method of deploying a Module to a CM Library of a Tester device according to one embodiment.

FIG. 5 is a flow diagram of a method 500 of deploying a Module to a CM Library of a Tester device according to one embodiment. Method 500 may be performed by processing logic that may comprise hardware (e.g., circuitry, dedicated logic, programmable logic, microcode, etc.), software, firmware, or a combination thereof. In one implementation, Appliance device 108 of FIGS. 1-3 performs method 500. In other implementations, other components of the CM system 100 described herein may perform some or all of the operations of the method 500.

Referring to FIG. 5, the method 500 begins with processing logic receives a Module over a network from a Service device (block 502). The processing logic determines if a communication is received from a CM client library of a Tester device (block 504). If no communication is received, the processing logic continues until a communication is received. The communication includes an argument from the CM client library. In response to the communication, the processing logic invokes the Module to be executed to generate a Module sequence based on the argument (block 506). The processing logic sends the Module sequence to the CM client library (block 508), and the method 500 ends. A tester script of the tester device delivers the Module sequence a CM Core of a target device in an operation phase of a manufacturing lifecycle of the target device.

In a further embodiment, the processing logic assembles tester information and PCD, signs a DSB, and creates the Module sequence with the tester information, PCD and the DSB. The processing logic may instruct a HSM of the respective device to assemble tester information and PCD, sign the DSB, and create the Module sequence. The tester device is configured to deliver the Module sequence to the CM Core of the target device as part of a test script.

Pre-Computed Data (PCD)

Pre-Computed Data, or PCD for short, serves as input to the Module. Its generation and packaging may occur on different parts of the CM system depending on the type of PCD. Specifically, it can be done either by the CM Root or by CM Service. Generally, different types of PCD correspond to different customer use-cases and therefore different Modules. This correspondence, however, is not one-to-one (or onto). Some Modules do not require PCD (e.g. a Debug Unlock Module), while others may require multiple types of PCD, such as a combined Serialization/Perso1/Perso2 Module. It's also possible for multiple Modules to consume a single type of PCD. For instance, HDCP keys, formatted as PCD, are likely to be consumed by several different Modules. Generation of PCD assets may or may not happen within the CM System 100, i.e. HDCP keys are imported into the CM System 100, not generated. In such case, the PCD packaging is a stage when assets are introduced into the CM System 100 in a form of PCD. For some types of pre-computed data, such as HDCP keys, PCD packaging may be performed by the Service. For other types, such as Perso1, it will be performed by the CM Root Authority. The CM Root Authority is a trusted, offline entity that authorizes Modules, CM Appliance devices, and clusters and generates PCD. The CM Root Authority is not connected to the CM System. A third option is for a Provisioning Authority (e.g., CRISP device 110) to provide packaged PCD directly into the CM Service. CM Services is the central management of the CM System hosted by the customer or Cryptography Research, Inc. The CM Service manages the distribution network of CM Appliance clusters and provisioning of pre-computed data (PCD) assets, ticket authorizations, signed sequences, and Modules across the network of CM Appliance devices. The following describes messaging for PCD deployment authorization.

In one embodiment, the Root device 102 includes a processor and a removable storage device interface configured to connect to a removable storage device. The processor is operable to receive a first command to generate a PCD asset for a target device that is unique to the target device. In response to the first command, the processor generates the PCD asset and packages the PCD asset for secure deployment of the PCD asset to the target device and to be used exclusively by the target device. The processor deploys the packaged PCD asset in a CM system for identification and tracking of the target device. In a further embodiment, the processor is further operable to receive a CLI command to generate a set of PCD assets in bulk based on a PCD Template, where the PCD Template is a description of how the PCD assets are formatted as an input for a particular type of Module. The processor generates the PCD asset as part of the generation of the set of PCD assets in bulk and packages the generated PCD asset for secure deployment. The processor distributes the packaged PCD asset over a network to an Appliance device of the CM system. The Appliance device is to securely provision the PCD asset to a CM Core of the target device using a Module of the particular type of Module, the Module is an application that, when executed by the Appliance device, results in a secure construction of a sequence of operations to securely provision the PCD asset to the target device in an operation phase of the manufacturing lifecycle of the target device.

In another embodiment, the Service device 104 includes a processor and a removable storage device interface configured to connect to a removable storage device. The processor is operable to receive a first command to package a PCD asset for a target device. In response to the first command, the processor packages the PCD asset for secure deployment of the PCD asset to the target device and to be used exclusively by the target device. The processor deploys the packaged PCD asset in a CM system for identification and tracking of the target device. In a further embodiment, the PCD asset is generated external to the CM device. In response to the first command, the processor is further operable to import the PCD asset, package the imported PCD asset for secure deployment, and distribute the packaged PCD asset over a network to an Appliance device of the CM system. The Appliance device is to securely provision the PCD asset to a CM Core of the target device using a Module, the Module is an application that, when executed by the Appliance device, results in a secure construction of a sequence of operations to securely provision the PCD asset to the target device in an operation phase of the manufacturing lifecycle of the target device.

Figure 6:
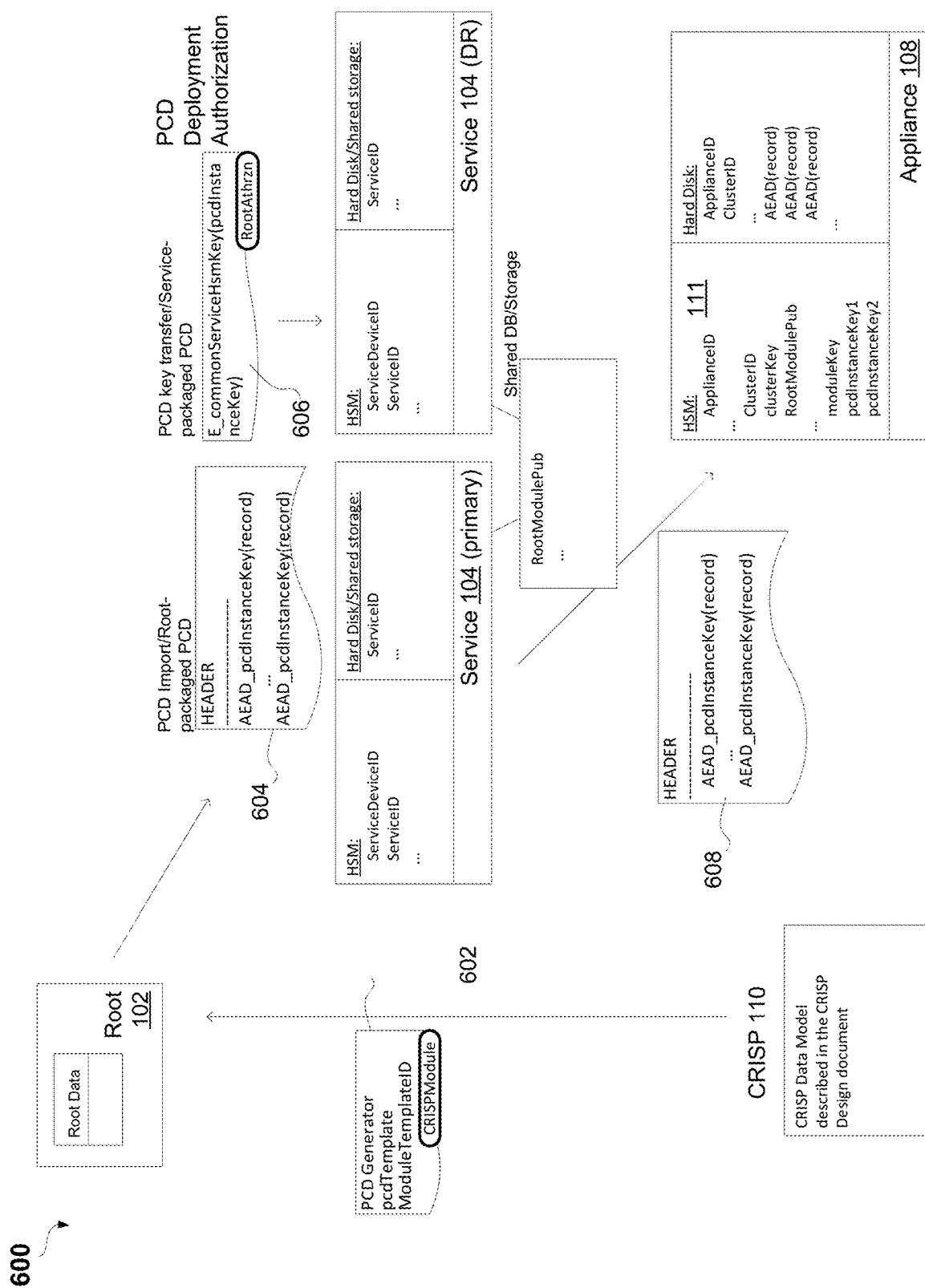
FIG. 6 is a diagram illustrating messages between devices of the CM system of FIG. 1 for pre-computed data (PCD) deployment authorization according to one embodiment.

FIG. 6 is a diagram illustrating messages between devices of the CM system of FIG. 1 for PCD deployment authorization 600 according to one embodiment. For PCD deployment authorization, CRISP device 110 provides a message 602 containing a PCD generator, a PCD Template, and a Module Template ID to the Root device 102. In another embodiment, the message 602 includes a PCD Template, a Module Template ID, a PCD wrapping public key, a PCD wrapping key reference, or the like. An additional message may include a PCD wrapping public key that is signed by an entity signing key. The message 602 may be signed by a CRISP Module key. The Service, including Service device 104 (primary) and Service device 104 (DR) and a shared database and storage, receives a message 604 to import a CM Root-packaged PCD. The message 604 may include a header and a payload of data (e.g., AEAD_pcdinstanceKey (record)). For CM Root-generated/packaged PCD, a CLI command set can be used for an operator to generate PCD assets in bulk based on a PCD Template, received in the message 602 from CRISP device 110. The bulk PCD assets can be exported from the Root device 102 and imported into the CM Service using a removable storage device, such as a USB flash drive. The Service device 104 may also import a message 606 with PCD key transfer/Service-packaged PCD. The message 606 can include a PCD instance key that is encrypted (wrapped) with a common service HSM key (e.g., E_commonServiceHSMKey(pcdinstanceKey)). Alternatively, the message 606 may include a package identifier, PCD type, Ticket Type, record format, record index type, record individual identifier length, record size, or the like. The message 606 can be signed by a Root Authorization key to be verified by the Service device 104. As illustrated in the depicted embodiment, Service devices 104 and the Appliance device 108 store various data in their respective HSMs or in hard disks or shared storage.

In one embodiment, a unique set of sensitive data assets for a target device is generated external to the target device. A CM device securely packages the unique set of sensitive data assets to ensure that the unique set of sensitive data assets is to be used exclusively by the target device. The CM device distributes the packaged unique set of sensitive data assets to the target device to provide subsequent identification and tracking of the target device.

The following describes various embodiments of PCD generation and deployment. PCD can be stored and indexed in records. Each entry (each PCD record) is referenced by an index. Each entry contains one or more fields of unencrypted data, encrypted data, and message authentication code (MAC) (e.g., a keyed cryptographic hash function). It is possible to parse unencrypted data for the purpose of detecting data duplicates. Common information in the entries may include the type of file, ticket type, and metadata associated with the PCD. The metadata may specify where the PCD may be used. The PCD records should be unique and each PCD record may have a globally unique identifier. The globally unique identifier may be sequential for sequentially accessed PCD. Typically, the globally unique identifiers are sequential for ticket-controlled PCD. In other embodiments, the globally unique identifier may be non-sequential for table-lookup PCD where each individual PCD record in the system maps to no more than one unique ticket. In some configurations, it is possible for one ticket to apply to more than one PCD record, but it is not possible for a single PCD record to be referenced by more than one ticket. The PCD records can be accessed sequentially or using table lookup (random access). In some implementations, there may be a large number of PCD record entries and the PCD file format should support large numbers ($2^{32}$) of records. The PCD file format may also be structured to be relatively compact even without file compression. In other implementations, PCDs can be structured to permit validation of PCD file headers and individual PCD entries without knowledge of cryptographic keys. This is referred to as an unkeyed integrity check for data protection, allowing detection of file corruption without knowledge of cryptographic keys. The PCDs are also structured to permit keyed integrity checks where it is possible for an entity in possession of cryptographic keys to validate the complete entry as well. That is the encrypted contents can be validated after the contents are decrypted. This may protect against malicious manipulation or key management problems.

In some implementations, PCD files can be chunked (split into separate files) without knowledge of cryptographic keys and without changing the bulk data fields. A single indexed PCD entry can be passed to an HSM in a manner that permits a fully keyed integrity check for the PCD entry, PCD type, and ticket type. The PCDs can be passed as a single, fully-validateable entry to HSM. This may be required for enforcement of ticket binding.

As described herein, PCD can be generated or imported by Root, Service, CRISP, or third parties. Modules and Module Templates may reference PCD, but PCD do not reference a Module. CRISP device 110 can be used to establish PCD Templates and file formats and Root device 102 can create, track, and manage PCD instantiations. A PCD instantiation should fall within the CRISP-provided template specification. However, the Root has discretion in identifying a PCD instantiation, specifying parameters for the PCD, linking tickets to PCD, and linking Modules to PCD. The PCD generating party should receive information about the PCD instantiation prior to generating PCD. The PCD can be managed and distributed in a PCD file or a PCD stand-alone record. The PCD file is a storage mechanism for multiple PCD records. PCD files can be manipulated and referenced without knowledge of cryptographic keys. The PCD file format is the primary mechanism for PCD storage and transmittal. The CM Service imports and stores PCD in this form. The PCD stand-alone record is a "complete" PCD record that is provided to the HSM for decryption, authentication, and ticket compliance check as illustrated in FIGS. 7-8.

Figure 7:
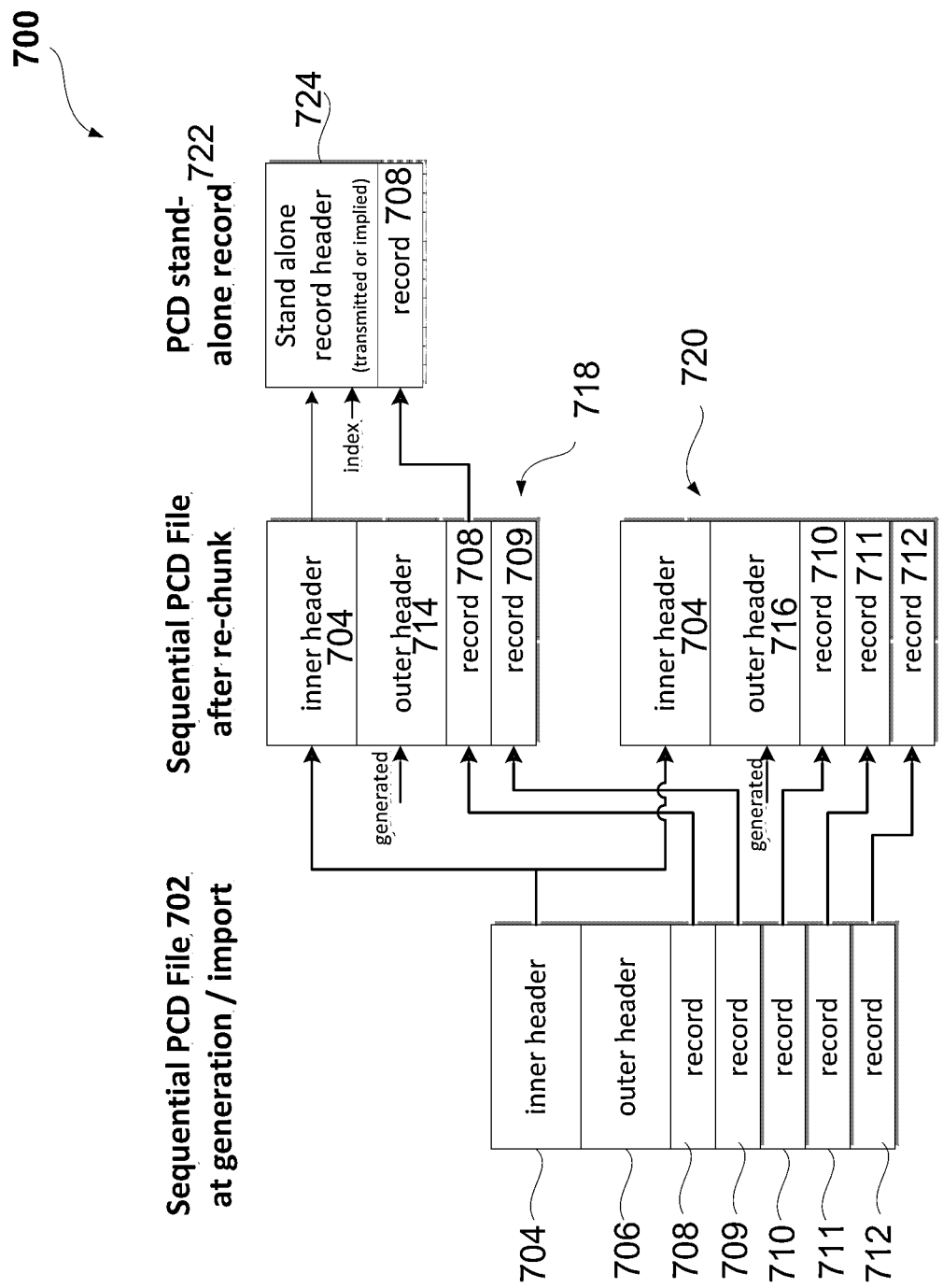
FIG. 7 is a flow diagram of a sequential PCD file at generation and import and two sequential PCD files after re-chunk according to one embodiment.

FIG. 7 is a flow diagram 700 of a sequential PCD file 702 at generation and import and two sequential PCD files after re-chunk according to one embodiment. The sequential PCD files 702 may be sequential and contain records that are sequentially indexed. There is a direct correspondence between index and record location within the file. These files generally convey data that is sequentially consumed. As illustrated in FIG. 7, the sequential PCD file 702 contains an inner header 704, and outer header 706 and multiple PCD records 708-712. The inner header 704 contains information that is shared by the PCD records 708-712. The inner header 704 is not modified after the sequential PCD file 702 is generated and is duplicated when the sequential PCD file 702 is re-chunked. The outer header 706 contains information relevant to the specific PCD file instance. It may be modified whenever the sequential PCD file 702 is re-chunked. The PCD records 708-712 are the individual PCD records, each specified by a recordFormat identifier in the inner header. For storage efficiency, information from inner and outer headers is not duplicated in the PCD records 708-712. FIG. 7 also illustrates a sequential PCD file after a re-chunk of the sequential PCD file 702. In this case, new outer headers 714 and 716 are generated to contain information relative to the specific PCD file instances (PCD file 718 and PCD file 720) after re-chunk. The inner headers 704 and PCD records 708-712 remain the same, but now are represented in two separate PCD files 718 and 720 with PCD records 708 and 709 in PCD file 718 and PCD records 710-712 in PCD file 720. The PCD records 708-712 can be stand-alone records, like PCD stand-alone record 722 for PCD record 708. The stand-alone record 722 may include a stand-alone record header 724 that can be accessed by an index. The stand-alone record header 724 can be transmitted or implied with the PCD record 708. This data structure is the means by which a single indexed PCD entry can be authenticated and decrypted. For example, the CM Appliance device software passes information of the PCD stand-alone record 722 to the HSM in this form. With no additional PCD information, the HSM is capable of fully decrypting and authenticating the PCD and ticket. PCD stand-alone record 722 may be created from any of the sequential PCD files 702, 718, 720. The process of creating a stand-alone record does not require cryptographic keys. The record 708 may contain a MAC, an encrypted data area, or both. The initialization vector (IV) and associated data required to perform these cryptographic operations is fully present within a stand-alone record 722. In some implementations, when a PCD record is transmitted to the HSM, the stand-alone record header 724 is implied and not transmitted.

Figure 8:
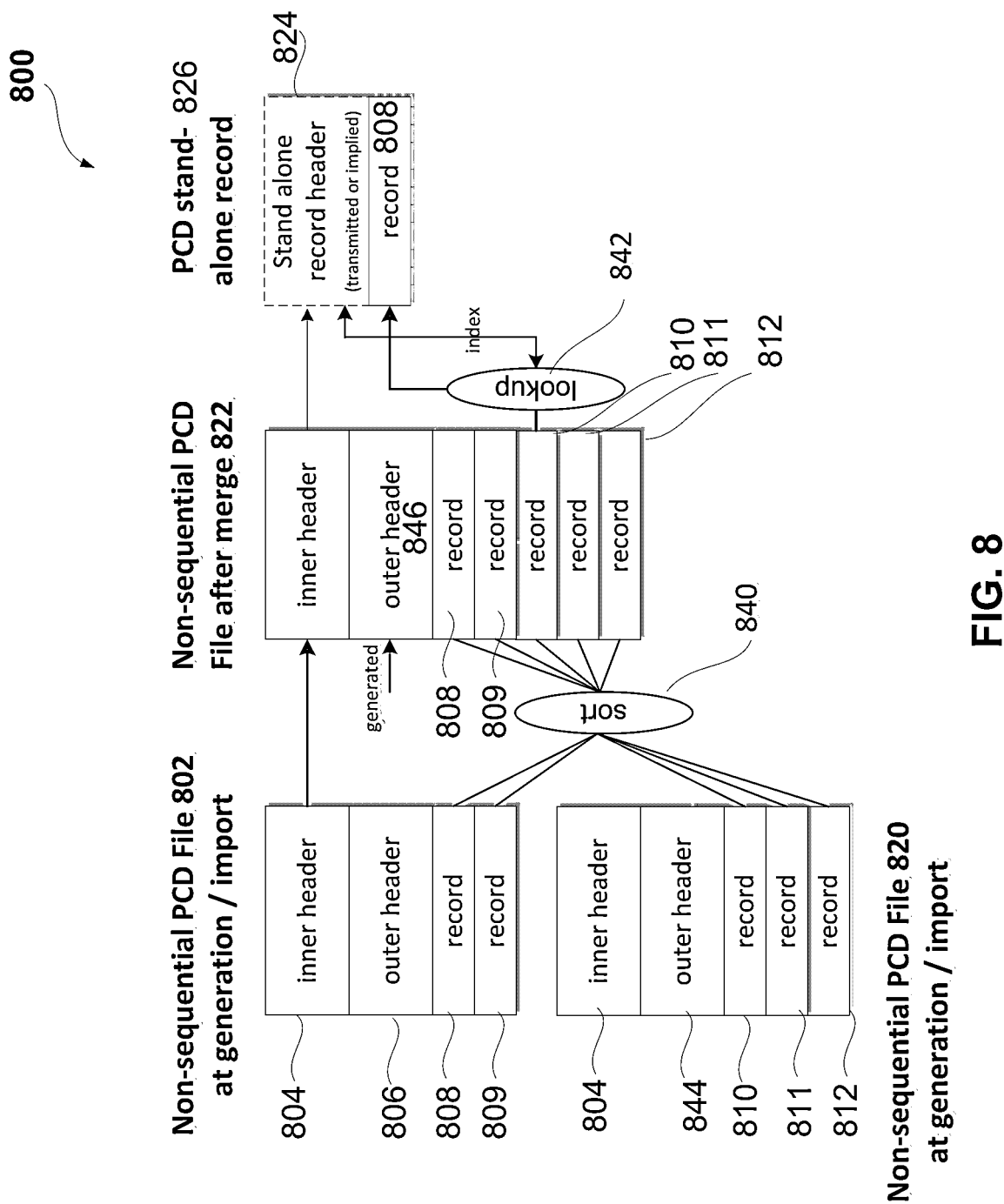
FIG. 8 is a flow diagram of two non-sequential PCD files at generation and import and a non-sequential PCD file after merge according to one embodiment.

FIG. 8 is a flow diagram 800 of two non-sequential PCD files 802, 820 at generation and import and a non-sequential PCD file 822 after merge according to one embodiment. The PCD files may also be non-sequential. These files contain records sorted by a non-sequential index. The PCD files 802, 820 may be non-sequential and contain records that are sorted by a non-sequential index. A file record is referenced with an index lookup, and these files are sometimes referred to as lookup PCD. As illustrated in FIG. 8, the PCD file 802 contains an inner header 804, and outer header 806 and multiple PCD records 808-812. The inner header 704 contains information that is shared by the PCD records 808-812. The inner header 804 is not modified after a merge with PCD file 820. The PCD file 822 is generated and the inner header 804 is duplicated after sorting 840 and merging the records 808-812. The outer header 806 contains information relevant to the specific PCD file instance, PCD file 802. It may be modified whenever the PCD file 802 is merged, such as with PCD file 820. The PCD file 820 also includes an inner header 804 and an outer header 844. The inner header 804 is the same, but outer header 844 contains information relevant to PCD file 820. The PCD records 808-812 are the individual PCD records, each specified by a recordFormat identifier in the respective inner header 804. In this example, PCD file 802 includes two PCD records 808, 809 and PCD file 820 includes three PCD records 810-812. For storage efficiency, information from inner and outer headers is not duplicated in the PCD records 808-812. FIG. 8 also illustrates the non-sequential PCD file 822 after a merge in which the PCD records 808-812 are sorted 840. A new outer header 846 is generated. The outer header 846 contains information relative to the PCD file 820 with the sorted records PCD 808-812. The inner headers 804 and PCD records 808-812 remain the same, but now are represented in one non-sequential PCD file 822 with sorted PCD records 808-812. The PCD records 808-812 can be stand-alone records, like PCD stand-alone record 826 for PCD record 808. The stand-alone record 826 may include a stand-alone record header 824 that can be accessed by an index via a lookup 842. The stand-alone record header 824 can be transmitted or implied with the PCD record 808. This data structure is the means by which a single indexed PCD entry can be authenticated and decrypted. For example, the CM Appliance device software passes information of the PCD stand-alone record 826 to the HSM in this form. With no additional PCD information, the HSM is capable of fully decrypting and authenticating the PCD and ticket. PCD stand-alone record 826 may be created from any of the PCD files 802, 820, 822. The process of creating a stand-alone record does not require cryptographic keys. The record 808 may contain a MAC, an encrypted data area, or both. The initialization vector (IV) and associated data required to perform these cryptographic operations is fully present within a stand-alone record 826. In some implementations, when a PCD record is transmitted to the HSM, the stand-alone record header 824 is implied and not transmitted.

Figure 9:
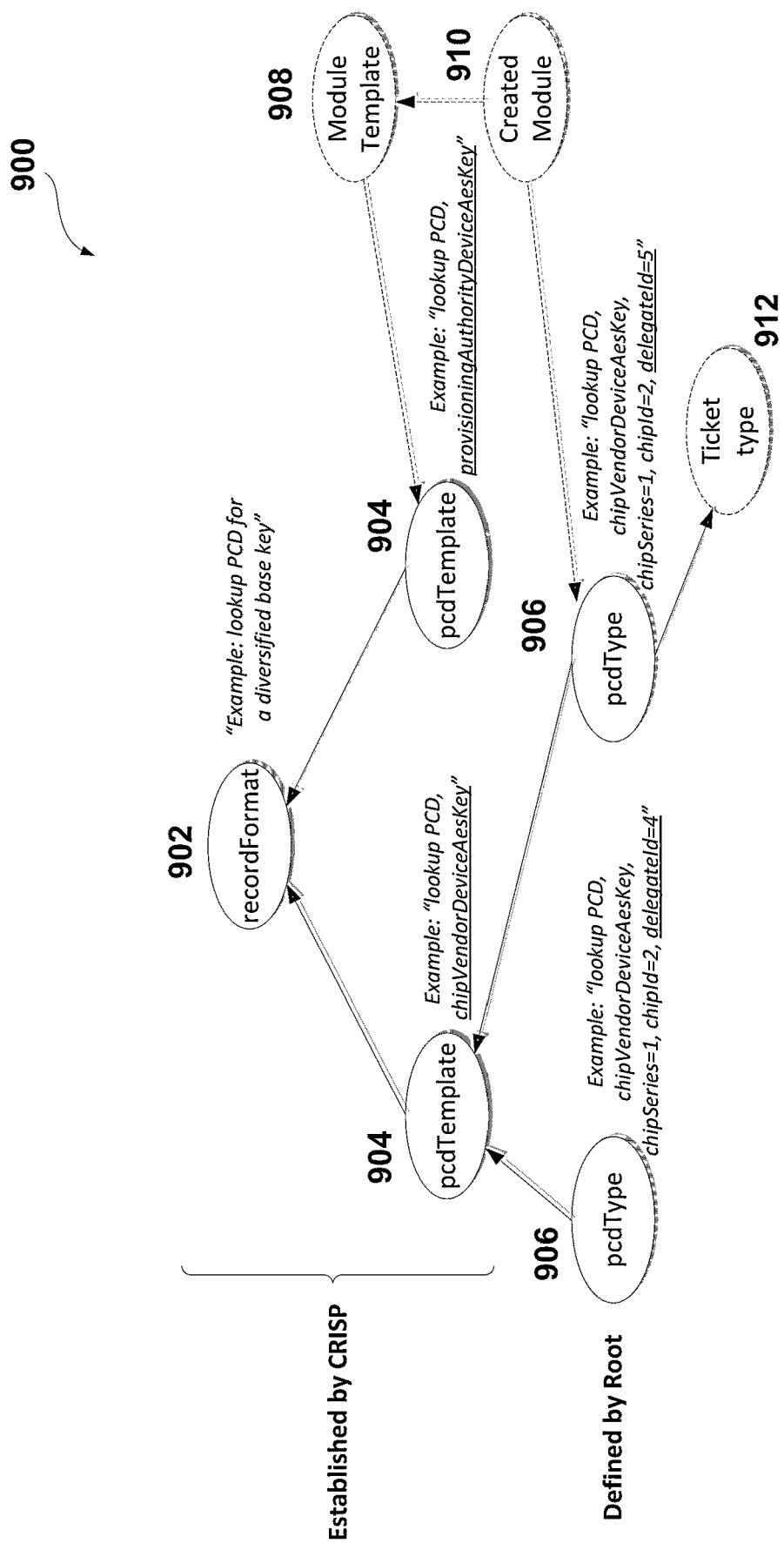
FIG. 9 is a diagram illustrating Module, PCD and Ticket relationships according to one embodiment.

FIG. 9 is a diagram illustrating Module, PCD and Ticket relationships according to one embodiment. The PCD definitions are record format 902 (recordFormat), PCD Template 904, and PCD type 906 (pcdType). Record format 902 identifies a specific per-record data structure. PCD Template 904 identifies a class of PCD assets that is used for a particular purpose and every PCD Template 904 references one record format 902 and includes metadata to describe how the PCD file will be generated or used. It should be noted that Module Templates 908 refer to a specific PCD Template 904. When a Module 910 is authored by the CM Root, the operator specifies PCD that corresponds to the specified PCD Template 904. PCD type 906 is an identifier for a specific instance of a PCD asset. Every PCD type 906 references one PCD Template 904. The CM Root creates new PCD types 906. At the time of PCD type 906 creation, associations, ticket bindings, keys, and parameters are fixed. Operational systems will accumulate new identifiers over time for record format 902, PCD Template 904, and PCD type 906. Because these definitions percolate through the system in ways that cannot be easily recalled, definitions of record format 902, PCD Template 904, and PCD type 906 should not change after they have been established. Migration involves creating a new definition and deprecating the old one over time. A specific PCD type 906 corresponds to a ticket type 912. Ticket types may be testing, development, production, or the like.

The following embodiments described how to locate a PCD record. For sequential data, a record's location in the file is determined based on record size (specified in an inner header) and index range (specified in an outer header). For non-sequential data, an index search is performed. Records are stored with indices in the first N bytes of a record as specified by recordIndividualIdentifierLength. Because a single PCD file may not contain the fully indexed space, the sequential index range specified by the outer header must be interpreted before determining if a PCD file contains the index in question.

In some embodiments of sequential data, the sequential data is ticketed with a ticket index that must identically match the sequential index. A strong uniqueness binding between the PCD element and ticket is desired. On the other hand, non-sequential data may not be ticketed. Although HSM Module invocations can be limited by a ticket, it is not possible for a ticket to map to the non-sequential index.

In some implementations, Sequential PCD files may be separated into smaller files for: (1) Allocation of different swaths to different CM Services or CM Appliance devices; or (2) Generating PCD of smaller granularity that can be communicated between the CM Service—CM Appliance device connection.

Many kinds of recordFormat can be defined to store various amounts and types of data in the PCD records, used at various points in the system processes. The value of the recordFormat field in the innerHeader can be used to indicate the kind of recordFormat used in the PCD. Some exemplary definitions for the records can be: serialization information, personalization information, device identifiers, various kinds of keys (e.g. provisioning authority keys, HDCP keys, device keys, etc.), a combination of the foregoing, etc. The following is an example of PCD recordFormat Definitions:

Each value assigned to a recordFormat would represent a different kind of recordFormat for a PCD record. Each kind of PCD record can store various types of data, such as keys, device identifiers, and other information. Such values can be encrypted or unencrypted, and integrity check values may also be included in the PCD.

For example, a system could be defined where a recordFormat (represented in the system with, for example, a value "2" in the innerHeader) could store the data to be included in provisioning of a target device. Such data can include a device identifier, a chip series identifier, and various key values. This data can be encrypted or decrypted, and include integrity check values for the data in the record. An example of RecordFormat 2 in a stand-alone record is provided in the following table (17 bytes).

| Category | Field | Bytes | Description |
|---|---|---|---|
| Stand-alone record for recordFormat 2 | | | |
| Data in implied header | deviceIdSequential | 0 | Non-obfuscated device identifier. The globally unique identifier consists of (chipSeries, devciceIdSequential). Index is implied and not stored |
| Unencrypted | deviceId | 8 | Obfuscated device identifier. [recordIndividualIdentifierLength=8] |
| | deviceIdCheck | 1 | Integrity check value for deviceId. |
| Integrity check | keyedIntegrityCheck | 8 | MAC of inner header + record. |

Other values for recordFormat would indicate a different kind of PCD record, with different categories, different fields and sizes, different descriptions, and different values. Another example is a recordFormat value indicating a PCD for an HDCP key. Such a PCD could hold data such as the sequential HDCP index, an HDCP keyset, a key select vector (KSV), and an integrity check value.

A recordFormat can be set up to disseminate large numbers of diversified deviceId-specific keys. The file may be stored in a form that enables rapid retrieval of an encrypted key value. Unless otherwise specified, PCD files should be managed and stored with records sorted by the index, which can be the first few bytes of unencrypted record data, for example.

The pcdTemplate defines a PCD record format and provides context on how the records are to be generated/used. It is referenced by the pcdTemplate identifier in the inner header. An example of pcdTemplate fields are shown in the following table.

| List of fields specified by pcdTemplate | |
|---|---|
| Name | Description |
| recordFormat | Specifies the type of record and recordSize. |
| recordIndexType | Specifies file organization and indexing scheme. 0 = RESERVED 1 = SEQUENTIAL. Records sequentially indexed. 2 = NON_SEQUENTIAL. Records are sorted with numerically increasing indexes. |
| recordMetadata | This fixed-length metadata field that is carried in the inner header and the single-element header. The format and structure of recordMetadata is specified by pcdTemplate. Some fields in the recordMetadata may also be specified by pcdTemplate. |

The following table includes PCD generation inputs. An example of PCD generation process may include the following global actions: Check of the presence of the values needed for generation of a specific PCD Type; Semantic validation of the metadata associated with the domain of the PCD type in question; Check for potential duplication of newly generated PCD. The PCD generation process may include the following per-record actions: Derivation of the deviceID; Derivation of the per-device keys; and Computation of integrity checks, which are included in the PCD record.

Figure 10:
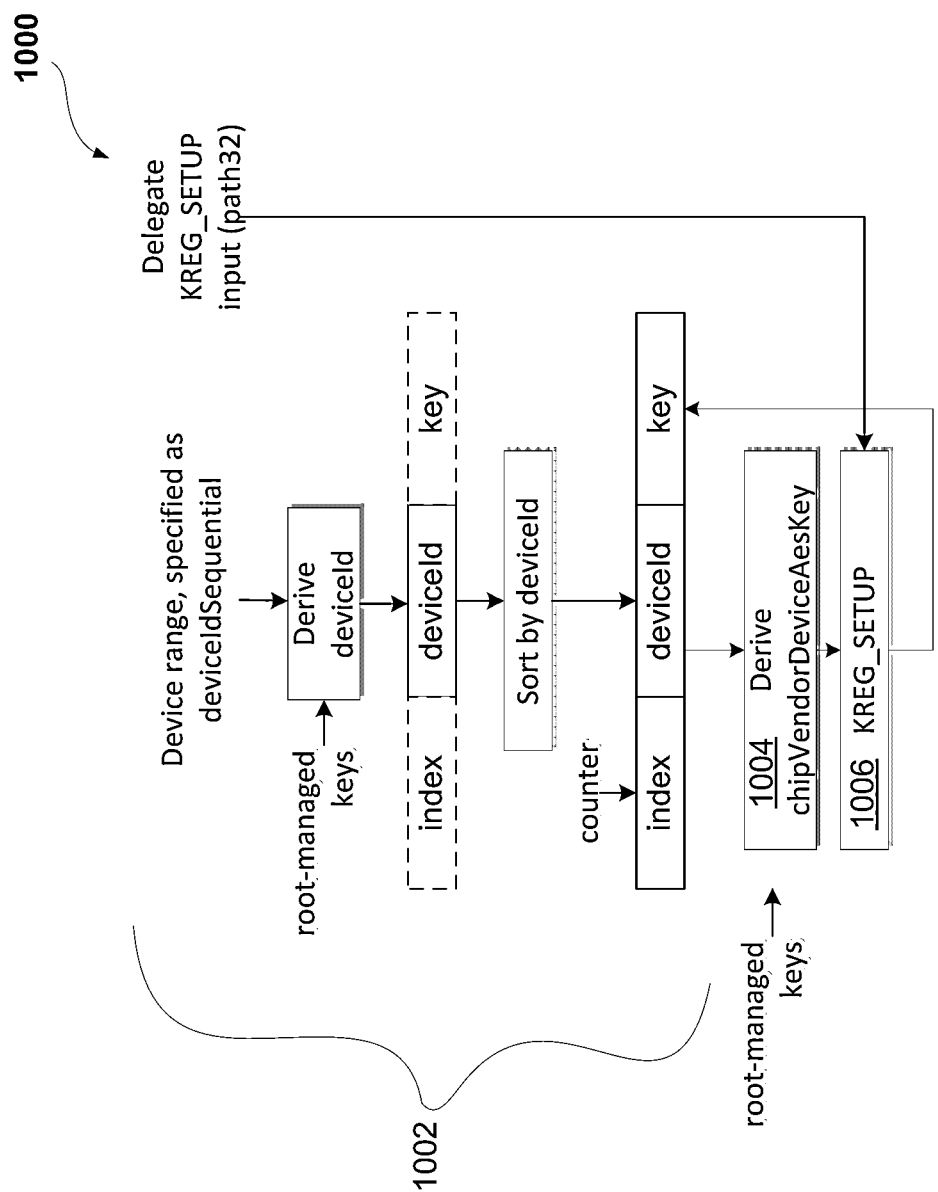
FIG. 10 is a flow diagram of a PCD generation process according to one embodiment.

FIG. 10 is a flow diagram of a PCD generation process 1000 according to one embodiment. The PCD generation process 1000 involves (1) generating the obfuscated deviceId value for each device in the output range (block 1002), (2) deriving the associated base key (block 1004), and (3) performing a diversification operation (1006). In other embodiments, other means of generating the data set can be used, such as incrementing through all deviceId values and SNE testing the counter. SNE, which stands for small-number encryption, is used to make serial numbers appear random in order not to reveal any information about the production yield. The generation of lookup table PCD is nearly identical to the process for pcdTemplate 0x0001 0001.

PCD Type Definitions: pcdTypes are created at the CM Root and reference a pcdTemplate. Example fields specified by pcdType (and selected when the pcdType is instantiated at CM Root) during creation are shown in the following table.

| fields specified at pcdType creation | |
|---|---|
| Name | Description |
| Name/Alias | This is to be specified in the root document; it is not currently part of the file format. |
| pcdTemplate | Specifies recordFormat and fields in recordMetadata |
| ticketType | The ticket type that is required before a record may be consumed by a CM Module. Each record in the PCD file can be uniquely referenced by (ticketType, pcdRecordIndex) |
| pcdTypeKey | AES256 key for PCD data. This key is generated for each pcdType and maintained by Root). |
| recordMetadata | This field is specified by pcdTemplate. Some elements in this field are fixed by the pcdTemplate, others are fixed when the pcdType is instantiated. |

PCD Type information is communicated from CM Root to CM Service (PCD management), Service-based PCD generator/importer (HDCP), or Third party PCD generator/importer (provisioningAuthority). PCD encryption and integrity checks can be done and the cryptographic scheme is specified by recordFormat. PCD may be encrypted. The following table includes PCD encryption keys.

| PCD encryption keys | | |
|---|---|---|
| Field | Bytes | Description |
| pcdTypeKey | x | Key (e.g. AES256) for PCD data. This key is generated for each pcdType and maintained by Root. It is exported in encrypted form for Modules referencing the pcdType. It is also exported to PCD creators or PCD importers. |

For High-bandwidth Digital Content Protection (HDCP), the import process translates key files from Digital Content Protection LLP directly to PCD format in a single step. HDCP encrypts and protects content as it is transmitted as a stream of digital data for display. Any device participating in the display chain requires an HDCP key to function. HDCP is developed by Intel® Corporation; licensing of HDCP technology is handled by Digital Content Protection, LLC, a subsidiary of Intel® Corporation. An HDCP key includes forty 56-bit secret values (keys), and one non-secret 40-bit value (key select vector, KSV). The HDCP import process is summarized in FIG. 11.

Figure 11:
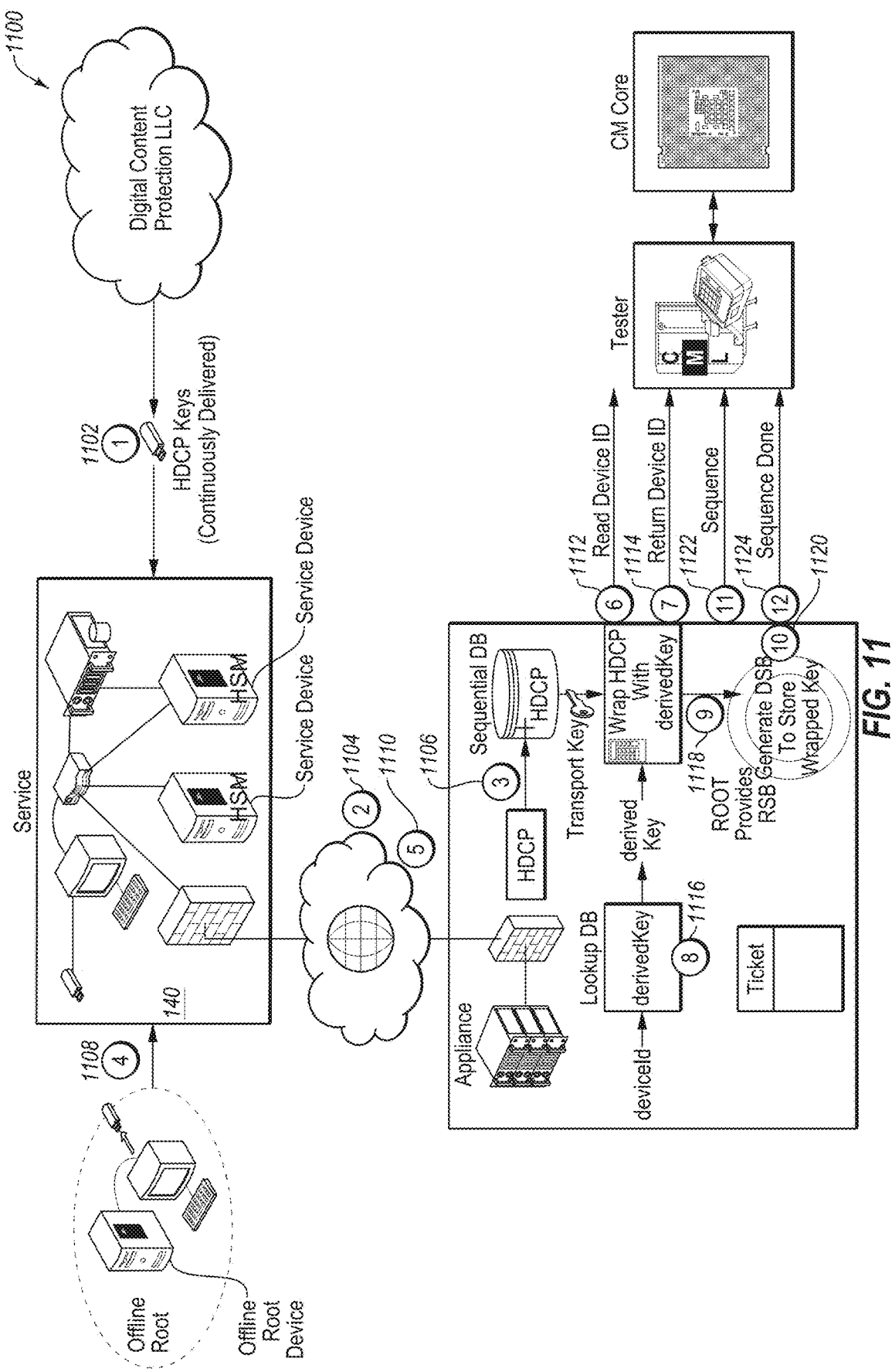
FIG. 11 is a network diagram illustrating a High-bandwidth Digital Content Protection (HDCP) import process according to one embodiment.

FIG. 11 is a network diagram illustrating a HDCP import process 1100 according to one embodiment. The HDCP import process 1100 begins with (1) New HDCP keys being received, encrypted, and uploaded to Service devices (block 1102). Encrypted HDCP keys are propagated to the Appliance device (2) (block 1104), which adds them to a sequential database (3) (block 1106). Root provides a Root Signed Block (RSB) and provisioning data (4) (block 1108), which is propagated to the Appliance device (5) (block 1110). Appliance device reads deviceId of the CM Core (6) (block 1112) via the Tester device and the Tester device returns the deviceID (7) (block 1114). The Appliance device looks up derivedKey based on the deviceId (8) (block 1116). An HDCP key is retrieved from the sequential DB, decrypted with transport key, and wrapped with derivedKey (9) (block 1118). The Appliance device constructs a sequence for burning the wrapped key (10) (block 1120). The sequence is sent to CM Core (11) (block 1122), which executes it and indicates the completion to Appliance device via interrupt or status updates (12) (block 1124).

On import, HDCP key is assigned a unique, sequentially incrementing, 64-bit PCD index for UID assignment. The single PCD index is used for both referencing and ticketing purposes. A complete duplication check may be performed (by KSV) as part of the import process. No independently indexed HDCP records within a specific PCD type may have a duplicated KSV. Detected duplicates result in rejection of the entire import set and require manual intervention to resolve. This permits comprehensive blocking of duplicate KSV on import. In other implementations a sanity duplicate check can be done on import. This may be a quick-returning duplication check at the beginning of the import process. The purpose of this check is to provide rapid feedback to a user that the HDCP disc has already been imported. The quick-returning check does not need to be fully comprehensive and may use KSV or other checking mechanisms.

In other implementations, the CM Appliance device requires a CM service-issued, record specific, cryptographic ticket before a HDCP record may be consumed for ticket enforcement. The complete CM ticketing system must enforce the single-use and unique nature of HDCP key provisioning. The CM Service device may track a history of all issued KSV values and issue an alert if duplicates are detected in log-based checks. Duplication checking may be performed based on (1) logs of CM Appliance device referenced KSV, (2) logs of CM Appliance device's sequences with KSV, (3) logs of CM Appliance device's consumed tickets, (4) Tester device logs, or the like. The system may track sufficient metadata to enable an offending duplicate to be identified. For example, when the system is in a healthy operating mode, log based alerts could be returned within 4 hours of the provisioning action. In other embodiments, ticketing can apply to other cases than HDCP key provisioning as described herein.

For data security, the CM Appliance device may only access/manipulate unencrypted HDCP keys within the HSM. In PCD form, KSV values must be readable without knowledge of cryptographic keys. This enables CM Service devices and CM Appliance devices to perform duplicate checking.

Figure 12:
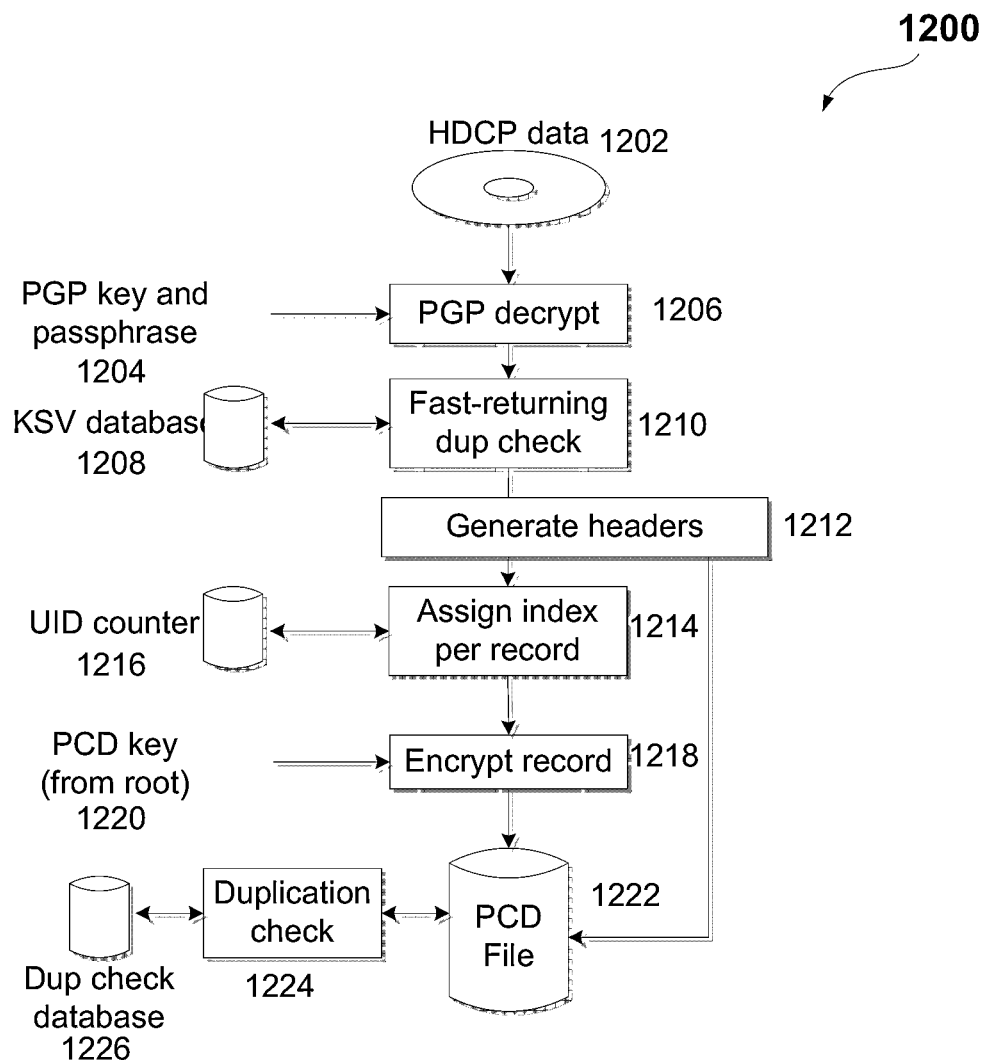
FIG. 12 is a flow diagram of an import process of an incoming HDCP asset in a HDCP lifecycle according to one embodiment.

FIG. 12 is a flow diagram of an import process 1200 of an incoming HDCP asset 1202 in a HDCP lifecycle according to one embodiment. The HDCP asset 1202 is decrypted using PGP key and passphrase 1204 (block 1206). A basic integrity check with KSV database 1208 is performed to confirm proper PGP decryption (bock 1210). This may be a quick sanitary duplicate check to ensure that the same HDCP key file has not been previously imported. The purpose of this check is to provide rapid feedback to a user that the HDCP disc has already been imported, where a comprehensive check may be performed at a later stage in the HDCP lifecycle. The file headers are generated (block 1212). A PCD index is assigned to each record (block 1214. Indices are sequential using a UID counter 1216. Once an index has been assigned, it is never re-used. The PCD record is encrypted (block 1218) into a PCD file 1222. A complete KSV duplicate check is performed against all files previously generated stored in duplicate data store 1226 (labeled DUP check database) (block 1224). This process ensures that (1) a KSV is allocated to a single UID only, and (2) a KSV only appears once. The backing database used for KSV comparisons includes PCD indices so that duplicates can be located/traced. It should be noted that if the check is performed on a fully formed PCD file, the same process can be used for other non-HDCP data. If duplicate checks fail, the entire PCD may be rejected. If all checks complete successfully, the duplicate data store 1226 is augmented with the newly imported KSV. The CM Service may augment its index tracking database to cover the new records. This process involves an index uniqueness check to ensure that there are no overlapping indices. The import is committed by the CM Service. The import and translation of the HDCP key file is considered successful at this point.

The following description describes PCD lifecycle decisions. One is lifecycle of serialization PCD. Serialization PCD is commonly referred to as wafer sort PCD. Each record includes device serialization data and optionally perso1 key splits. Another PCD lifecycle decision is allocation/setup process in which CM Root defines a new pcdType whenever a chipSeries or chipId changes and CM Root communicates a pcdType authorization/definition to the CM Service device. Another PCD lifecycle decision is Generation dependencies types. PCD is produced by CM Root via a cmCoreVersion specific generator. All data/code required for generation is managed by CM Root. Another PCD lifecycle decision is Production generation. CM Root generates PCD to give the CM Service a sufficient inventory, such as more than 6 months of inventory. It is recommended that ranges of deviceIdSequential values be allocated to production and non-production services. The PCD files may be imported into the CM Service directly.

An example of PCD lifecycle is the lifecycle of p5 PCD. The provisioning authority PCD is produced by CRISP (as the provisioning authority) and imported directly to the CM Service device. For Allocation/setup process, the CM Root defines a new pcdType whenever the cmCoreVersion changes and communicates a pcdType authorization/definition to the CM Service device. The CM Root communicates pcdType information to CRISP. A secure and authenticated means is used to transmit pcdType information (in particular, inner header data and pcdTypeKey). CRISP generates (or opts to re-use) SNE parameters, master keys, and other data associated with the provisioningAuthorityDeviceAesKey. For Generation dependencies, this PCD is produced by CRISP via a generator that uses CRISP-managed secrets for key generation and SNE serial number generation. Packaging of the PCD (headers, encryption) requires pcdType information sourced by Root. For Production generation, CRISP generates PCD to give the CM Service sufficient inventory (e.g., more than 6 months). The PCD files are imported into the CM Service directly.

An example of PCD lifecycle is the lifecycle of key lookup PCD. Key lookup PCD is used to convey a group of diversified base keys. It is designed to be accessed as a lookup table. Key lookup PCD is used for convey diversified values of: chipVendorDeviceAesKey, indexed by deviceId; and provisioningAuthorityDeviceAesKey, indexed by provisioningAuthorityId. For Allocation/setup decisions for chip VendorDeviceAesKey, the CM Root defines a new pcdType whenever: (1) chipSeries, (2) chipId, or (3) delegate ID changes. In practice, a number of pcdTypes may be created at once for a block of delegate ID's. The CM Root communicates a pcdType authorization/definition to the CM Service device. For Allocation/setup decisions for provisioningAuthorityDeviceAesKey, the CM Root defines a new pcdType whenever: (1) cmCoreVersion, or (2) ID changes. In practice, a number of pcdTypes may be created at once for a block of delegate ID's. The CM Root communicates a pcdType authorization/definition to the CM Service device and communicates pcdType information to CRISP. A secure and authenticated means is used to transmit pcdType information (in particular, inner header data and pcdTypeKey). For generation of dependencies for chipVendorDeviceAesKey, PCD is produced by CM Root. All data/code required for generation is managed by CM Root. For generation of dependencies for provisioningAuthorityDeviceAesKey, PCD is produced by CRISP. CRISP-managed secrets are used for key generation and SNE serial number generation. Packaging of the PCD (headers, encryption) requires pcdType information sourced by Root. For production generation, Lookup PCD is usually generated in large quantities. Data files can be large, e.g., 500M records fit in a 24 GB PCD file (recordFormat 10 has 48 bytes/record). Performance is relatively high on CPU cores with AES-NI accelerators. The PCD files are imported into the CM Service directly.

In order to perform asset distribution, Module deployment, log collection and other basic functions, Service needs to get current state of the Appliance devices it manages. This is done using a GetState message and related JSON-RPC API call. Using this method, in conjunction with two other messages, PCD Removal and Module Removal, allows Service to handle the state of the Appliance devices appropriately. Messages originated at the Service are signed using the ServiceSigningPriv, while those provided by the Appliance device are signed using ApplianceHsmSigningPriv.

The embodiments described herein describe technologies for pre-computed data (PCD) asset generation and secure deployment of the PCD asset to a target device in an operation phase of a manufacturing lifecycle of the target device in a cryptographic manager (CM) environment. One implementation includes a Root Authority (RA) device that receives a first command to generate a unique PCD asset for a target device. In response, the RA device generates the PCD asset and packages the PCD asset for secure deployment of the PCD asset to the target device and to be used exclusively by the target device. The RA device deploys the packaged PCD asset in a CM system for identification and tracking of the target device.

Figure 13:
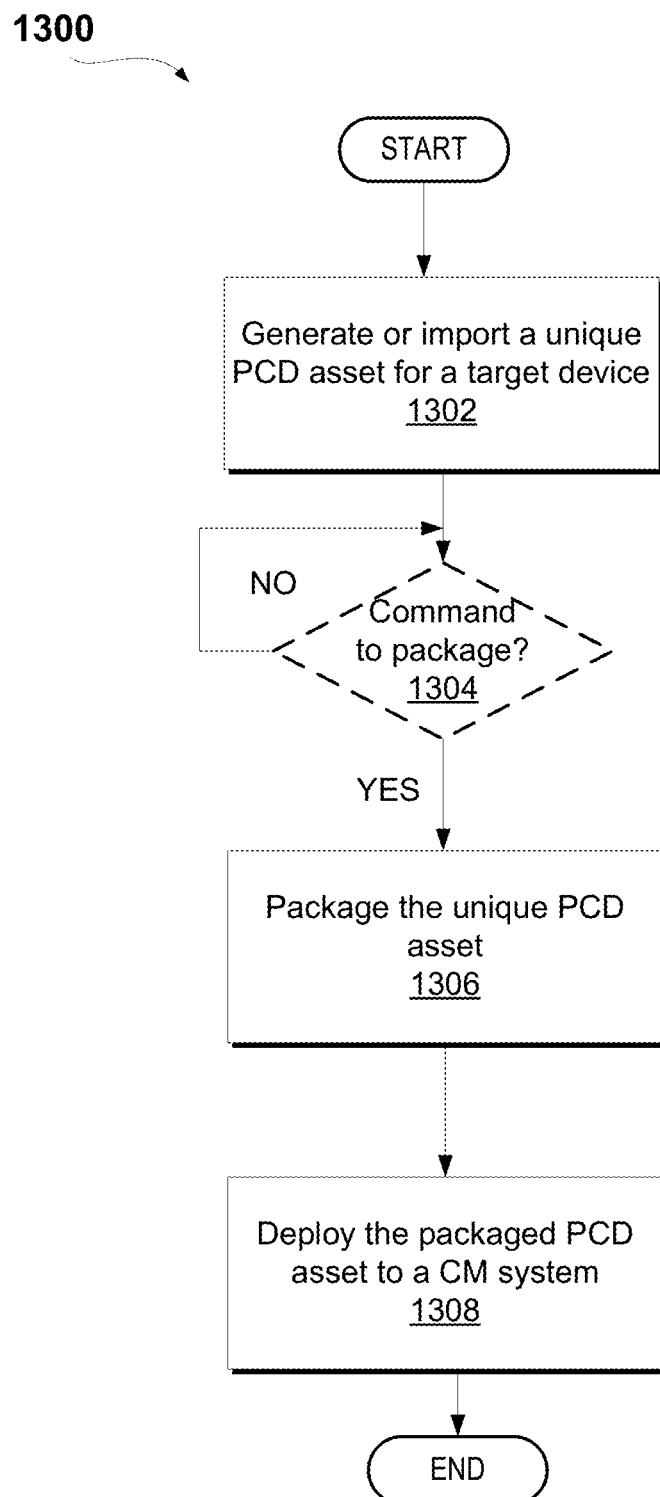
FIG. 13 is a flow diagram of a method of generating and packaging a PCD asset for secure deployment in a CM system according to one embodiment.

FIG. 13 is a flow diagram of a method 1300 of generating and packaging a PCD asset for secure deployment in a CM system according to one embodiment. Method 1300 may be performed by processing logic that may comprise hardware (e.g., circuitry, dedicated logic, programmable logic, microcode, etc.), software, firmware, or a combination thereof. In one implementation, Root device 102 of FIGS. 1-3 performs method 1300. In one implementation, Service device 104 of FIGS. 1-3 performs method 1300. In other implementations, other components of the CM system 100 described herein may perform some or all of the operations of the method 1300.

Referring to FIG. 13, the method 1300 begins with processing logic generating or importing a unique PCD asset for a target device (block 1302). The processing logic receives a command to package the unique PCD (block 1304). The processing logic packages the PCD asset for secure deployment of the PCD asset to the target device and to be used exclusively by the target device (block 1306). The processing logic deploys the packaged PCD asset in a CM system for identification and tracking of the target device (block 1308), and the method 1300 ends In one embodiment, the processing logic resides in a Root device. In response to the command, the processing logic generates the PCD asset and packages the generated PCD asset for secure deployment. The PCD asset can be deployed by the processing logic storing the packaged PCD asset in a removable storage device to transfer the PCD asset to a Service device of the CM system. The Service device is configured to distribute the PCD asset over a network to an Appliance device of the CM system. The Appliance device may securely provision the PCD asset to a CM Core of the target device using a Module and the PCD asset is an input to the Module. The Module is an application that, when executed by the Appliance device, results in a secure construction of a sequence of operations to securely provision the PCD asset to the target device in the operation phase of the manufacturing lifecycle of the target device. In one embodiment, the PCD asset is generated in response to a command line interface (CLI) command to generate PCD assets in bulk based on a PCD Template. The PCD Template is a description of how the PCD assets are formatted as an input for a particular type of Module. In a further embodiment, the PCD Template corresponds to a PCD type, the PCD type corresponds to a set of PCD assets having a particular property of at least one of a uniqueness or serialization. The set of PCD assets of the PCD type may be indexed.

In another embodiment, the processing logic resides in a Service device. In response to the command, the Service device generates and packages the PCD asset for secure deployment. In another embodiment, the PCD asset is generated external to the Service device and the processing logic of the Service device imports the PCD asset and packages the imported PCD asset for secure deployment.

In one embodiment, the imported PCD asset is a HDCP key. In other embodiments, the generated PCD asset is a personalization key or a serialization key as described herein. The imported PCD asset may be signed by a root authorization private key and the processing logic can verify the imported PCD asset using a root authorization public key.

As described above, the PCD asset may be stored in a stand-alone record, or as a PCD record in a PCD file containing at least one additional PCD record. The PCD file may be a sequential PCD file or a non-sequential PCD file. The sequential PCD file may include: 1) an inner header containing information that is shared by the PCD record and the at least one additional PCD record; 2) an outer header containing information relevant to an instance of the sequential PCD file before any splitting of the sequential PCD file; and 3) the PCD record and the at least one additional PCD record. The non-sequential PCD file may include: 1) an inner header containing information that is shared by the PCD record and the at least one additional PCD record; 2) an outer header containing information relevant to an instance of the non-sequential PCD file after a merge of a first non-sequential PCD file and a second non-sequential PCD file; and 3) the PCD record and the at least one additional PCD record.

In one embodiment, the processing logic can split the sequential PCD file into a first sequential PCD file and a second sequential PCD file. The processing logic generates a first outer header containing information relevant to the first sequential PCD file for the first sequential PCD file so that the first sequential PCD file includes the inner header, the first outer header containing information relevant to the first sequential PCD file and the PCD record after splitting. The processing logic also generates a second outer header containing information relevant to the second sequential PCD file so that the second sequential PCD file includes the inner header, the second outer header containing information relevant to the second sequential PCD file and the at least one additional PCD record after splitting.

In another embodiment, the processing logic merges a first non-sequential PCD file and a second non-sequential PCD file into the non-sequential PCD file. The processing logic sorts the PCD record and the at least one additional PCD record and generates the outer header. In this embodiment, the first non-sequential PCD file may include: 1) the inner header, 2) a first outer header containing information relevant to the first non-sequential PCD file; and 3) the PCD record. The second non-sequential PCD file may include: 1) the inner header, 2) a second outer header containing information relevant to the second sequential PCD file; and 3) the at least one additional PCD record.

Tickets

A ticket may be used in the consumption and provisioning of data assets, such as PCD assets. As used herein, a ticket may be a digital file or data that enables enforcement of usage count limits and uniqueness/sequential issuance of target device parameters. Tickets may be authorized by the Root Authority and consumed by the target devices during manufacturing and/or testing. A ticket may provide the authorization for the target device to consume a data asset, for example a pre-computed cryptographic key. The ticket may also bind the data asset to be consumed by the target device for recording and auditing purposes and may provide an inventory tracking mechanism for individual data assets. This information may be communicated over the network from the manufacturing facility to the customer.

A ticket or ticket authorization is a verifiable value that a Module may require in order to run a transaction. Ticket authorizations may be quick to produce and verify (symmetric MAC) and can be issued by an Appliance device for itself or by an Appliance cluster peer. A ticket authorization may include an index value (e.g., to select pre-computed records, make serial numbers) and a ticket type and request identifier to prevent misuse or reuse.

A given ticket authorization may give permission to the Appliance device such that it is bound to run a Module a specific number of times, such as once. The ticket authorization may become a serial number, which may then or later be encrypted to make an encrypted serial number, or be used as a pre-computed data index in order to reference pre-computed data. The ticket can be consumed by the Appliance device that created it or by an Appliance cluster peer and may be bound to a specific request.

Tickets and their use in the asset-management system may enable the separation of management of permissions from operations and data. For example, a ticket type that selects HDCP keys may be used by multiple Modules. Tickets may allow a cluster member to share authorizations while connected to prevent the reuse of serial numbers, HDCP keys, and or other credentials or data. Appliance devices can satisfy their own ticket requirements if the Appliance cluster connectivity is lost. The tickets may be used to enforce limits on the number of transactions an Appliance device or Appliance cluster can do. While connected the Appliance devices 108, the Service devices 104 (Service 107) may allocate more ticket authorizations to the Appliance devices. The ticket authorizations may be provided on an as-needed or as-used basis, or larger qualities of ticket authorization may be provided such that if connectivity is lost, Appliance devices can run for a time during which attempts to restore connectivity may be made. This may prevent downtime in the manufacturing facility.

Each Appliance in an Appliance cluster may include a ticket issuer, which may be processing logic on the Appliance that manages ticket authorizations. The ticket issuer may operate to track cluster peers' available ticket resources, receive ticket requests from Modules or peers, send request to a local HSM daemon or query a cluster peer's ticket issuer. The HSM may issue ticket authorizations sequentially, subject to ranges authorized by Service device and may respond with a valid ticket or an error message.

The tickets may be used to monitor the inventory of assets and assess a state of the assets. The collective state of the assets is comprised of the key, data assets (pre-computed data) and ticket authorization inventory both in transit and stored both on the Service and on the Appliance devices. This may provide a local state of the assets, the state being local to the manufacturing facility. Where the customer has or has contracted for the manufacture of devices at a plurality of facilities, this local state data may be combined with other local state data to provide global state data for the customer.

The state information may be provided to the customer in a user interface with the information needed to forecast the future demand for pre-computed data and ticket authorizations at the factory. Once the demand can be estimated, the Operator may set the inventory so that an appropriate margin of inventory is distributed by the Service 107 to each factory Appliance cluster to be consumed in future production. An appropriate minimum volume of pre-computed data and ticket authorizations may be maintained on the Appliance cluster to guarantee a specified production uptime in the absence of factory connectivity given an estimated factory consumption rate.

Figure 14:
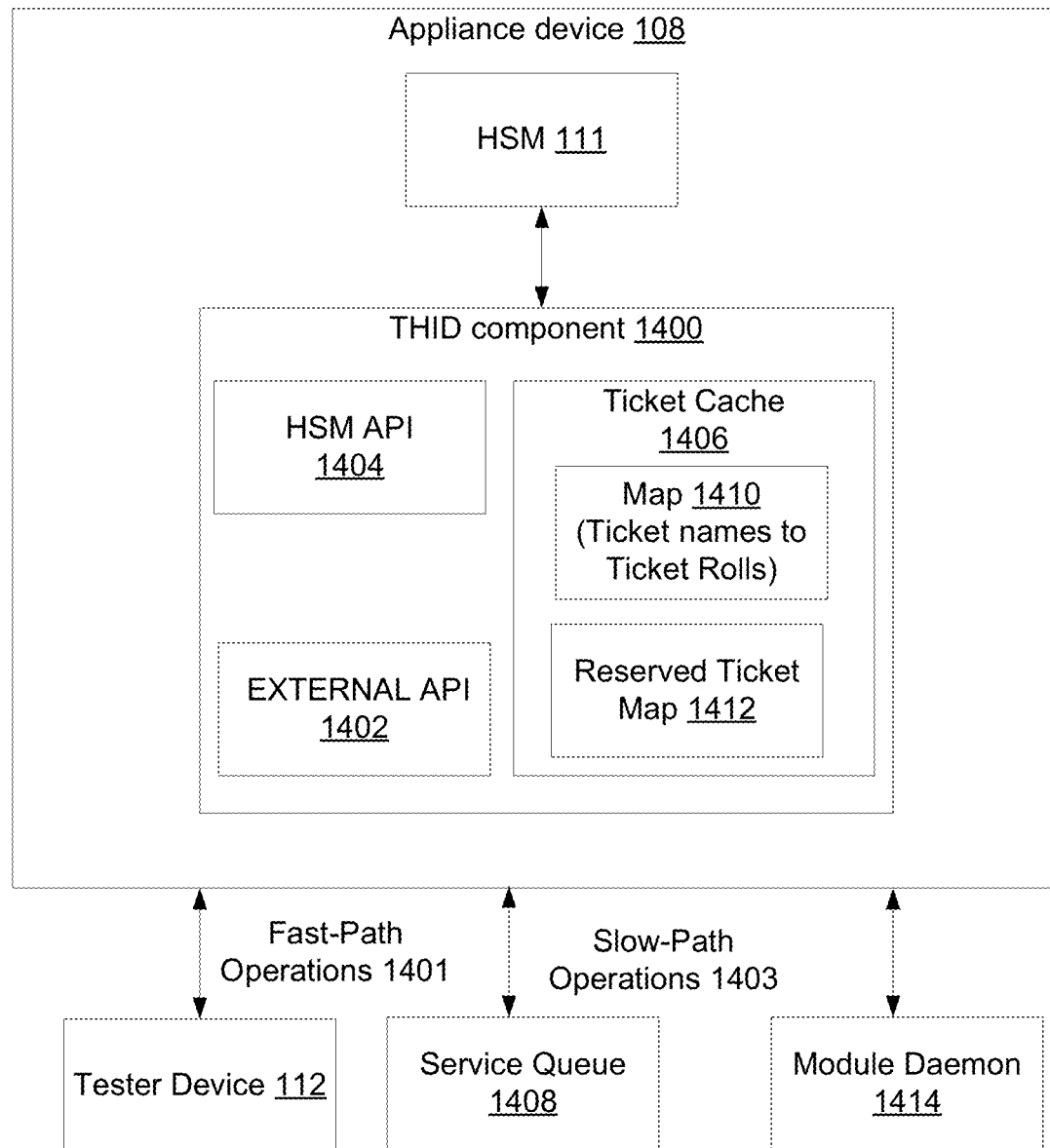
FIG. 14 is a block diagram of a Ticketing and HSM Interaction Daemon (THID) component according to one embodiment.

FIG. 14 is a block diagram of a Ticketing and HSM Interaction Daemon (THID) component 1400 according to one embodiment. The THID component 1400 includes a THID external API 1402 and an HSM API 1404. A THID component 1400 may be provided to manage an HSM 111 of Appliance device 108, particularly in connection with ticket authorization. This THID component 1400 may provide other components operating on an Appliance device 108 (or on the Appliance cluster 109) an interface to access the HSM 111 for confidentiality or integrity computations. These computations or operations may be fast-path operations 1401 or slow-path operations 1403. Fast-path operations 1401 may be understood as time-critical operations originating from a Tester device 112 to acquire tickets or invoke a Module, while slow-path operations 1403 may be understood as those originating from a service queue 1408, or those operations that are not fast-path operations 1401. Slow-path operations 1403 may be operations that add tickets from the Service 107 to the Appliance device 108 (or Appliance cluster 109), operations that audit tickets used by a certain time or rate of ticket usage and other asset consumption information, and operations to remove tickets. The THID component 1400 may provide multiple application programming interfaces (APIs) to facilitate the communication with other components in the Appliance device 108.

The THID component 1400 may accept multiple simultaneous requests. The requests may then be serialized since the HSM 111 can only service one request at a time. The THID component 1400 may be the only path to the HSM 111 in the Appliance device 108. The THID component 1400 includes a ticket cache 1406 that keeps a map 1410 of ticket names to sets of ticket rolls (with minimum and maximum ticket values) to effectively mirror a ticket state of the HSM 111. The ticket cache 1406 may be used to offload all ticket requests off the HSM 111 e.g., GetTickets( ) requests) and handle them in THID component 1400. Since the ticket state persists in HSM 111, on startup, the THID component 1400 may call for an audit of the tickets on the HSM 111 and initialize the ticket cache 1406 with the results of the audit or count. For example, the THID component 1400 calls AuditTickets( ) on the HSM 111 and initialize the Ticket cache 1406 with the results. The ticket cache 1406 may additionally track "reserved" tickets in a separate companion map 1412, which are tickets requested by a Module daemon 1414 (e.g., via GetTickets( )), but not yet sent back to THID component 1400 for a call to invoke a particular Module (e.g., InvokeModule( )). A Module daemon 1414 parses CM Modules and prepares relevant data and CM Module management.

Thus, the THID component 1400 may provide APIs that affect the cache state, while other APIs do not. For example, an external API 1402 can issue commands to a service queue 1408 to add tickets, audit tickets or remove tickets. For example, external API 1402 for the AddTickets (tickets, importCounter, hsmId, and signature) command returns void. For another example, AuditTickets (challenge) command returns (hsmId, tickets, importCounter) and RemoveTickets(tickets, importCounter, hsmId, signature) returns void. To the Module Daemon 1414, the external API 1402 can issue various commands: GetTickets (ticketNames) returns tickets; LoadModule (Module, signature, keys) returns moduleHandle; UnloadModule (moduleHandle) returns void (not currently used by Module daemon 1414); and InvokeModule (moduleHandle, input, tickets) returns sequence. In other embodiments, the THID component 1400 may include provisioning and activation related APIs.

Most of the above passes through directly to HSM. The HSM API 1404 to THID can add tickets, audit tickets, remove tickets, load Modules, unload Modules, invoke Modules, or the like. The HSM API 1404 may include the following: AddTickets (tickets, importCounter, hsmId, signature) returns void; AuditTickets (hsmId, challenge) returns (hsmId, tickets, importCounter); RemoveTickets (tickets, importCounter, hsmId, signature) returns void; LoadModule (Module, signature, keys) returns moduleId; UnloadModule (moduleId) returns void; and InvokeModule (moduleId, input, tickets) returns sequence.

For example, APIs that affect the cache state may include an API to get tickets, which may return tickets to be removed from the cache and put into the reserved tickets map 1412; an API to add tickets to be forwarded directly to the HSM 111, and after the HSM 111 completes the operation, the THID component 1400 may call an API (e.g., AuditTickets( ) on the HSM 111) to audit the tickets on the HSM 111. The ticket cache 1406 may be cleared and set to the audited state. This may allow the "add tickets" data to be completely opaque to THID component 1400.

Tickets currently reserved are then removed from the ticket cache 1406 to keep the two sets disjoint. 3) Audit- Tickets( )—after every explicit AuditTickets( ) request from the service queue 1408, the ticket cache resynchronizes the ticket cache 1406 as done for Add/RemoveTickets( ) (mainly as insurance against drift from the Module daemon 1414 crashing/invoke errors, etc.). The service queue 1408 can serve as a gateway to the CM Appliance device 108 for the CM Service. 4) InvokeModule( )—On a successful invocation of a Module, the tickets involved will be considered spent and removed from the reserved ticket map 1412. In the event of a failure, it may not be clear if the reserved ticket map 1412 can be relied upon to infer that those tickets are unspent. The THID component 1400 may throw away the tickets as spent to prevent the reuse of a ticket or of pre-computed data. A resynchronization (as described above) restores any tickets THID component 1400 threw away conservatively that turned out to be unspent.

THID component 1400 may be used as a gateway to HSM 111 for transactions from Tester device 112 and Service device 104. Tickets currently reserved may then be removed from the ticket cache 1406 to keep the two sets disjoint. After a request to audit the tickets is made, the ticket cache 1406 may be resynchronized to prevent drift that may be caused by Module daemon 1414 crashing/invoke errors, etc. A ticket may be used in a tracking system used by the CM System to enforce the number of times a Module can be run on the Appliance device 108 and to track the assets used by a Module. Tickets ensure that assets are not duplicated or double-spent. The ticket includes data that enables enforcement of usage count limits and uniqueness/sequential issuance of CM Core parameters. Tickets may be authorized by the Root Authority and consumed by the CM Core.

In one implementation, on a crash and restart, THID component 1400 will not have any reserved tickets, so any in-progress Module invokes in the Module daemon 1414 (i.e. between GetTickets( ) and InvokeModule( )) will fail THID's requirement that the tickets must be reserved, so InvokeModule( ) will fail. If the module daemon 1414 crashes and restarts, or simply errors between the ticket request or Module calls to THID component 1400, tickets that were reserved may not be sent to THID component 1400, allowing reserved tickets in THID component 1400 to accumulate. Thus, in some embodiments the reserved tickets may be time-stamped and, upon resynchronization, may be removed if they are more than a certain threshold number of seconds old. This serves as a mechanism to expire tickets to keep the reserved tickets in THID component 1400 from accumulating.

In some instance, more Modules may be assigned by the Service device 104 to an Appliance device than can fit in a memory of the HSM 111. The THID component 1400 may load and unload Modules to manage the HSM's memory, evicting one or more Modules via a "least frequently used" policy. For example, Module LRU may be used to manage HSM's memory, evicting via a LRU policy. This may be particularly useful in a deployment of the asset-t management system in which multiple customers share an Appliance cluster.

Tickets may be the only authoritative information as to what pre-computed data indexes have been spent, and since the THID component 1400 may have knowledge of the ticket, the THID component 1400 may perform a pre-computed data cleanup process to reclaim the disk space of spent pre-computed data packages.

During normal operation, the THID component 1400 is the sole interface to the delegate Appliance device's HSM. The THID component 1400 abstracts the ticket management process, synchronizes access to the HSM 111, and manages the HSM's memory and other resources.

The HSM 111 (and thus its interface point, the THID component 1400) has three main functions; 1) Issuing and spending asset-management Tickets; 2) Running HSM bit code; and 3) Auditing. Bitcode is run using the hsmInvokeModule call. However, bitcode is signed and may contain encrypted components. Running bitcode may be split into two calls so that HSM 111 does not verify the signature and decrypt any encrypted components on every call of hsmInvokeModule. loadHsmOps loads the bitcode into the HSM, verifies its signature and decrypts (and possibly schedules) any encrypted keys it might contain. The bitcode is actually executed by the hsmInvokeModule call.

In one embodiment, ticketing may be done in three phases: 1) Tickets are loaded from the Service device into the THID component 1400 and HSM 111 using the addTickets call; 2) The THID component 1400 allocates the tickets using the getTickets call; and 3) The tickets are spent by HSM bitcode in the hsmInvokeModule call.

There are two types of audits, one for bitcode and one for ticketing. Bitcode invocations can contain logging calls. This data is passed through a running hash, and will also be recorded by the THID component 1400. The HSM 111 can be ordered to export and sign this hash. The HSM 111 has limited memory, so it will store only the running hash. The HSM 11 can be ordered to export and sign its ticketing-related state. If some of this state is stored externally by the THID component 1400 (e.g., the low-memory-HSM proposal in asset-management Tickets), then the THID component 1400 passes it through the HSM 111 so that the HSM 111 can sign it. The main purpose of the THID component 1400 is to provide all other components running on the Appliance device a unified interface to access to the asset-management HSM component for any confidentiality or integrity computations.

There may be some exceptions. Because this is an RPC API, exceptions that can be thrown by client code fall into three categories: 1) The RPC library may throw std::logic_error, std::bad_alloc and similar if it runs out of memory or encounters a bug. Clients are not advised to handle these exceptions (except with a finally clause or equivalent) because they usually represent serious errors where recovery may not be an option. 2) The RPC library may throw a CriRpc::RpcException if the RPC fails (wrong version at server, connection interrupted, logic errors in the RPC library); 3) If the server throws an exception, the RPC library will relay it as a CriRpc::RelayedException. When some numbers of tickets are added, the tickets are passed as a vector of struct ticketStruct.

The HSM may maintain a count of the number of authorizations it has received from the Service device, which is also the expected counter value for the next authorization. The HSM can check this counter value, check the signature, add the tickets to its inventory, and then increment its counter value. This prevents authorizations from being replayed.

There are two types of audits, one for bitcode and one for ticketing. Bitcode invocations can contain logging calls. This data is passed through a running hash, and will also be recorded by the THID component 1400. The HSM 111 can be ordered to export and sign this hash. The HSM 111 has limited memory, so it will store only the running hash. The HSM 11 can be ordered to export and sign its ticketing-related state. If some of this state is stored externally by the THID component 1400 (e.g., the low-memory-HSM proposal in asset-management Tickets), then the THID component 1400 passes it through the HSM 111 so that the HSM 111 can sign it.

The main purpose of the THID component 1400 is to provide all other components, running on the Appliance device, a unified interface to access to the asset-management HSM component for any confidentiality or integrity computations. Because this is an RPC API, exceptions that can be thrown by client code fall into three categories: The RPC library may throw std::logic_error, std::bad_alloc and similar if it runs out of memory or encounters a bug. Clients are not advised to handle these exceptions (except with a finally clause or equivalent) because they usually represent serious errors where recovery may not be an option. The RPC library may throw a CriRpc::RpcException if the RPC fails (wrong version at server, connection interrupted, and logic errors in the RPC library); If the server throws an exception, the RPC library will relay it as a CriRpc::RelayedException. The table below illustrates THID Component APIs according to one embodiment.

| Function | Caller | Stage | Notes |
|---|---|---|---|
| void addTickets(vector<ticketRoll> tickets, uint64 counter, byteArray hsmId, byteArray signature) | Service Queue | Pre-alpha | |
| tuple<ticketAuditStruct, byteArray, ticketAuditStruct, byteArray> removeTickets(vector<ticketRoll> tickets, uint64 counter, byteArray hsmId, | Service Queue | Production | This call is rare, and may be slow. Not required for pre-alpha. |

-continued

| Function | Caller | Stage | Notes |
|---|---|---|---|
| byteArray challenge, byteArray signature) | | | |
| vector<uint64> getTickets(uint64 ticketName, int n=1) | Module Daemon | Pre-alpha | Can return fewer than n tickets. |
| pair<ticketAuditStruct, byteArray signature> auditTickets(byteArray challenge) | Service Queue | Production | This function might need to export additional information. |
| int loadHsmOps(byteArray module, byteArray signature, vector<byteArray> encryptedModuleKeys) | Module Daemon | Pre-alpha | |
| byteArray hsmInvokeModule(int moduleHandle, byteArray inputBlock, | Module Daemon | Pre-alpha | The moduleHandle argument must have been |

-continued

| Function | Caller | Stage | Notes |
|---|---|---|---|
| vector<pair<uint64,uint64>> tickets) | | | preloaded by this module. |
| logRecord commitLog(byteArray log) | Logging Daemon | Pre-alpha | |
| pair<logAuditStruct, byteArray> auditLogs(byteArray challenge) | Logging Daemon | Pre-alpha | |

One example of the addTickets call is as follows:
void addTickets(vector<ticketRoll>tickets,
uint64 counter,
byteArray hsmId,
byteArray signature)

To add some number of tickets to the system, the tickets are passed as a vector of struct ticketStruct. The HSM 111 maintains a count of the number of authorizations it has received from the Service device, which is also the expected counter value for the next authorization. The HSM 111 will check this counter value, check the signature, add the tickets to its inventory, and then increment its counter value. This prevents authorizations from being replayed. The following table includes parameters and corresponding descriptions.

| Parameter | Description |
|---|---|
| tickets | The serialized tickets to be added. |
| counter | Must be set equal to the current value of the HSM's service import counter. |
| hsmId | Must be set equal to the HSM's 16-byte unique ID. |
| signature | An RSA-PSS signature of ("addTickets"\|\|hsmId\|\|counter\|\|tickets) using the service's ticket-issuing key. |

The struct ticketRoll can be represented as follows:

| Offset in bytes | Field Name | Type | Size in bytes | Description |
|---|---|---|---|---|
| 0 | ticketName | uint64 | 8 | The ticket's name. |
| 8 | minTicketID | uint64 | 8 | The beginning of the roll. |
| 16 | maxTicketID | uint64 | 8 | The end of the roll. The roll contains tickets numbered from minTicketID to maxTicketID, inclusive. |
| 24 | mode | modeEnum | 1 | The ticket's mode. Should be set to stock. |
| 25 | reserved | uint8[7] | 7 | Reserved, must be set to 0. |

The enum modeEnum can be represented as follows:

| Name | ID | Meaning |
|---|---|---|
| stock | 0 | The ticket was authorized to this HSM. |
| issued | 1 | The ticket was authorized to some other HSM, and has been transferred to this one. |

This function loads the given ticket rolls into the HSM.

| Exception | Description |
|---|---|
| SignatureException | The signature didn't verify. |
| HsmStateException | The hsmId or counter value was wrong. |
| InvalidParameterException | Some other aspect of the parameters was invalid, e.g. the hsmId or signature was the wrong size. |

-continued

| Exception | Description |
|---|---|
| InternalError | Some other internal error occurred, e.g. the HSM or THID ran out of memory. |
| RpcException | The usual RPC exceptions, e.g. I/O errors. |

The removeTickets call can be expressed as follows:
tuple<ticketAuditStruct,
  byteArray,
  ticketAuditStruct,
  byteArray>
removeTickets(vector<ticketRoll>tickets,
  uint64 counter,
  byteArray hsmId,
  byteArray challenge,
  byteArray signature)

This function removes all the tickets listed in the tickets input from the HSM. The following table includes parameters and corresponding descriptions.

| Parameter | Description |
|---|---|
| tickets | The serialized tickets to be removed. |
| counter | Must be set equal to the current value of the HSM's service import counter. |
| hsmId | Must be set equal to the HSM's 16-byte unique ID. |
| signature | An RSA-PSS signature of ("removeTickets"\|\|hsmId\|\|counter\|\|tickets) using the service's ticket-issuing key. |

The HSM first performs a ticket audit, producing a ticketAuditStruct, and signs ("responseBeforeRemoveTickets"\|\|challenge\|\|ticketAuditStruct). It then removes the given tickets, performs another audit, and signs ("responseAfterRemoveTickets"\|\|challenge\|\|ticketAuditStruct). The following table includes exceptions and corresponding descriptions:

| Exception | Description |
|---|---|
| SignatureException | The signature didn't verify. |
| HsmStateException | The hsmId or counter value was wrong. |
| InvalidParameterException | Some other aspect of the parameters was invalid, e.g. the hsmId, challenge or signature was the wrong size. |
| InternalError | Some other internal error occurred, e.g. the HSM or THID ran out of memory. |
| RpcException | The usual RPC exceptions, e.g. I/O errors. |

The getTickets call can be expressed as follows:
vector<uint64>getTickets(uint64 ticketName, int n=1)

The following table includes parameters and corresponding descriptions:

| Parameter | Description |
|---|---|
| ticketName | The name of the ticket to be added. |
| n | The number of tickets requested. |
| return value | An array of ticket numbers, of length at most n. |

This function returns a vector of at least one and at most n tickets with the given name. It tries to return n tickets, but if fewer than n can be obtained quickly, then it will return quickly rather than wait for the full n.

Tickets may have cryptographic data associated with them for the scenarios where the Appliance device is used as external memory for the HSM. This data is retained by the THID component 1400; it is not returned by this call.

The tickets returned by this call can only be spent by the same client using hsmInvokeModule. They cannot be used by another process which is connected to the THID component. The getTickets call merely reserves the tickets. If the caller disconnects from the THID component before spending them, the THID component may give the same tickets to another client. The following table includes exceptions and corresponding descriptions:

| Exception | Description |
|---|---|
| InvalidParameterException | The value of n passed was not positive. |
| NoTicketsException | There aren't any tickets with that name. |
| InternalError | Some other internal error occurred, e.g. the HSM or THID ran out of memory. |
| RpcException | The usual RPC exceptions, e.g. I/O errors. |

The auditTickets call can be expressed as follows:
pair<ticketAuditStruct,
  byteArray signature>
auditTickets(byteArray challenge)

The following table includes the parameters and corresponding descriptions:

| Parameter | Description |
|---|---|
| challenge | An optional challenge. Must be exactly 0 or 16 bytes long. If it is 16 bytes long, the challenge should be random. |

The response is a ticketAuditStruct:

| Offset in bytes | Field Name | Type | Size in bytes | Description |
|---|---|---|---|---|
| 0 | hsmId | uint8[16] | 16 | The HSM's unique ID |
| 16 | counter | uint64 | 8 | The HSM's service interaction counter. |
| 24 | nrolls | uint32 | 4 | The number of ticket rolls present. |
| 28 | tickets | ticketRoll[nrolls] | 32*nrolls | The ticket rolls. |

The tickets in the structure are not returned in any particular order. If a challenge is specified, the HSM 111 will produce a signature on ("responseAuditTickets"\|\|challenge\|\|ticketAuditStruct). Otherwise, the signature will be an empty byteArray. The following table includes exceptions and corresponding descriptions.

| Exception | Description |
|---|---|
| InternalError | Some internal error occurred. |
| InvalidParameterException | The challenge wasn't exactly 0 or 16 bytes long. |
| RpcException | The usual RPC exceptions, e.g. I/O errors. |

The loadHSMOps call can be expressed as follows:
int loadHsmOps(byteArray module, byteArray signature, vector<byteArray>encryptedModuleKeys)

The following table includes the parameters and corresponding descriptions.

| Parameter | Description |
| --- | --- |
| Module | The packed Module data, output by the compiler/root HSM. The format of this byte array is described on the CM HSM page. |
| signature | The signature on the Module data, as described on the CM HSM. |
| encryptedModuleKey | The packed value of the Module key encrypted to the cluster key, prepared from the root HSM, as described on the CM HSM page. |
| return value | A Module handle ID. |

This function loads the given Module into the HSM. Any keys present in the Module itself are encrypted with the encryptedModuleKeys; those key is given to the THID component separately. The HSM may not have enough memory to store the ops for every Module on the system. In this case, the THID component is responsible for managing the HSM's memory, loading and unloading code as the load demands. The following table includes the exceptions and corresponding descriptions.

| Exception | Description |
| --- | --- |
| SignatureException | The Module's signature didn't verify. |
| DecryptionException | The decryption of the encryptedModuleKeys or the Module's key zone(s) failed. |
| InvalidParameterException | Some other aspect of the parameters was invalid, e.g. the signature was the wrong size. |
| InternalError | Some other internal error occurred, e.g. the HSM or THID ran out of memory, or the Module didn't parse as ASN.1. |
| RpcException | The usual RPC exceptions, e.g. I/O errors. |

The hsmInvokeModule call can be expressed as follows:
byteArray
hsmInvokeModule(int moduleHandle,
    byteArray inputBlock,
    vector<pair<uint64,uint64>>tickets)
The following table includes the parameters and corresponding descriptions.

| | |
| --- | --- |
| moduleHandle | A module handle ID returned by loadHsmOps. |
| inputBlock | A block of packed input to the Module. |
| tickets | An array of (ticket name, ticket number) pairs. |
| return value | The HSM's output. |

This function calls a Module which has been preloaded with loadHsmOps. It must be given a moduleHandle that was returned by a loadHsmOps call from this client. Likewise, the second element of the tickets argument must be a ticket number that was returned to this client from a getTickets call (the first element is the ticket's name). Once the HSM code has run, its result is returned as a byte array. The following table includes the exceptions and corresponding descriptions.

| Exception | Description |
| --- | --- |
| NoSuchModuleException | The moduleHandle is invalid, i.e. it was not returned to this client by a loadHsmOps call. |

-continued

| Exception | Description |
| --- | --- |
| DecryptionException | The module failed to decrypt a piece of pre-computed data. |
| InvalidParameterException | Some other aspect of the parameters was invalid, e.g. there is the wrong number of tickets or the input is the wrong size. |
| InternalError | Some other internal error occurred, e.g. the HSM or THID ran out of memory, or the module's bitcode is invalid. |
| RpcException | The usual RPC exceptions, e.g. I/O errors. |

The commitLog call can be expressed as follows:
logRecord
commitLog(byteArray log)
Adds an external log message to the HSM's log chains. The following table includes exceptions and corresponding descriptions.

| Exception | Description |
| --- | --- |
| InternalError | Some internal error occurred. |
| RpcException | The usual RPC exceptions, e.g. I/O errors. |

The auditLogs call can be expressed as follows:
pair<logRecord, byteArray>
auditLogs(byteArray challenge)
The auditLogs signs a running hash of the current logs using the HSM Audit key. A challenge is used to prevent deferring and replays. It should be random. The following table includes exceptions and corresponding descriptions.

| Exception | Description |
| --- | --- |
| InternalError | Some internal error occurred. |
| RpcException | The usual RPC exceptions, e.g. I/O errors. |

The THID component 1400 maintains a shadow copy of the state of the HSM 111, minus the cryptographic keys. This means that the HSM code can be simpler, and also means that the THID component 1400 doesn't need to ask the HSM 111 for any information except for cryptographic information. The THID component 1400 might also maintain (per the CM Ticketing System specs) some cryptographic information outside of the HSM 111, such as a hash tree. This is not currently expected to be used. If it is used, then this information is MAC'd by the cluster key, but resides outside of the HSM 111 for memory reasons.

Ticket Names are used to group types of tickets together. Ticket Names may be 64 bits. The bytes have the following meaning:

| MSB | 6 | 5 | 4 | 3 | 2 | 1 | LSB |
| --- | --- | --- | --- | --- | --- | --- | --- |
| Vendor ID | | | | Ticket Type | | Unique ID | |

The following Ticket Types are allocated:

| Ticket Type | Description |
| --- | --- |
| 0 | Testing |
| 1 | Development |
| 2 | Production |

In summary, a Ticket is a signed authorization to run a Module one single time. Tickets provide control of Module execution, allow duplicate prevention as well as provide an audit trail of such execution (audit log). Internally, a Ticket may be a pair of 64-bit strings, a Ticket Name and a Ticket ID. Ticket Name represents a Ticket type. If a particular Ticket Name is associated with PCD Type, Ticket ID identifies a particular PCD record. Such association is captured in the "input" section of the Module file. Internally, HSM maintains a list of CurrentTickets for each of the Ticket Names that are known to it. It also maintains a counter (hsmTicketCounter) used to prevent replay attacks. The ticket may also be signed. Even though each ticket may not have an individual signature, a ticket roll (a set of tickets) may have a signature. Verification of this signature can be used for ticket validation. There are three types of ticket-related messages—Audit, Grant and Remove. Ticket Audit gathers the internal state of the HSM 111 and transfers it to the Service. Ticket Grant provides new tickets to the HSM 111, while Ticket Remove removes the tickets from the HSM 111. The diagram below describes the contents of each of the message types.

Since ticket communications occur between the HSM 111 and the Service device 104, the contents of each of the message need to be ASN.1-encoded. Here are the definitions of the ASN.1 messages:

```
TicketAudit ::= SEQUENCE {
    hsmID IA5String,
    hsmTicketCounter IA5String,
    currentTickets CmTickets
}
CMTickets ::= SEQUENCE {
    currentTicket IA5String
}
```

Here CMTickets is defined as a SEQUENCE and not a SET to preserve ordering of elements. This could be useful for searching through the list of tickets if Service and Appliance HSM agree to sort the tickets and process the list in order.

The following defines the ASN.1 format of the ticket grant message.

```
TicketGrant ::= SEQUENCE {
    hsmID IA5String,
    hsmTicketCounter IA5String,
    grantedTickets CmTicketRange
}
CmTicketRange ::= SEQUENCE {
    ticketName IA5String,
    ticketRangeStart IA5String,
    ticketRangeEnd IA5String
}
```

The following represents the ticket removal message:

```
TicketRemoval ::= SEQUENCE {
    hsmID IA5String,
    hsmTicketCounter IA5String,
    grantedTickets CmTicketRange
}
```

Figure 15:
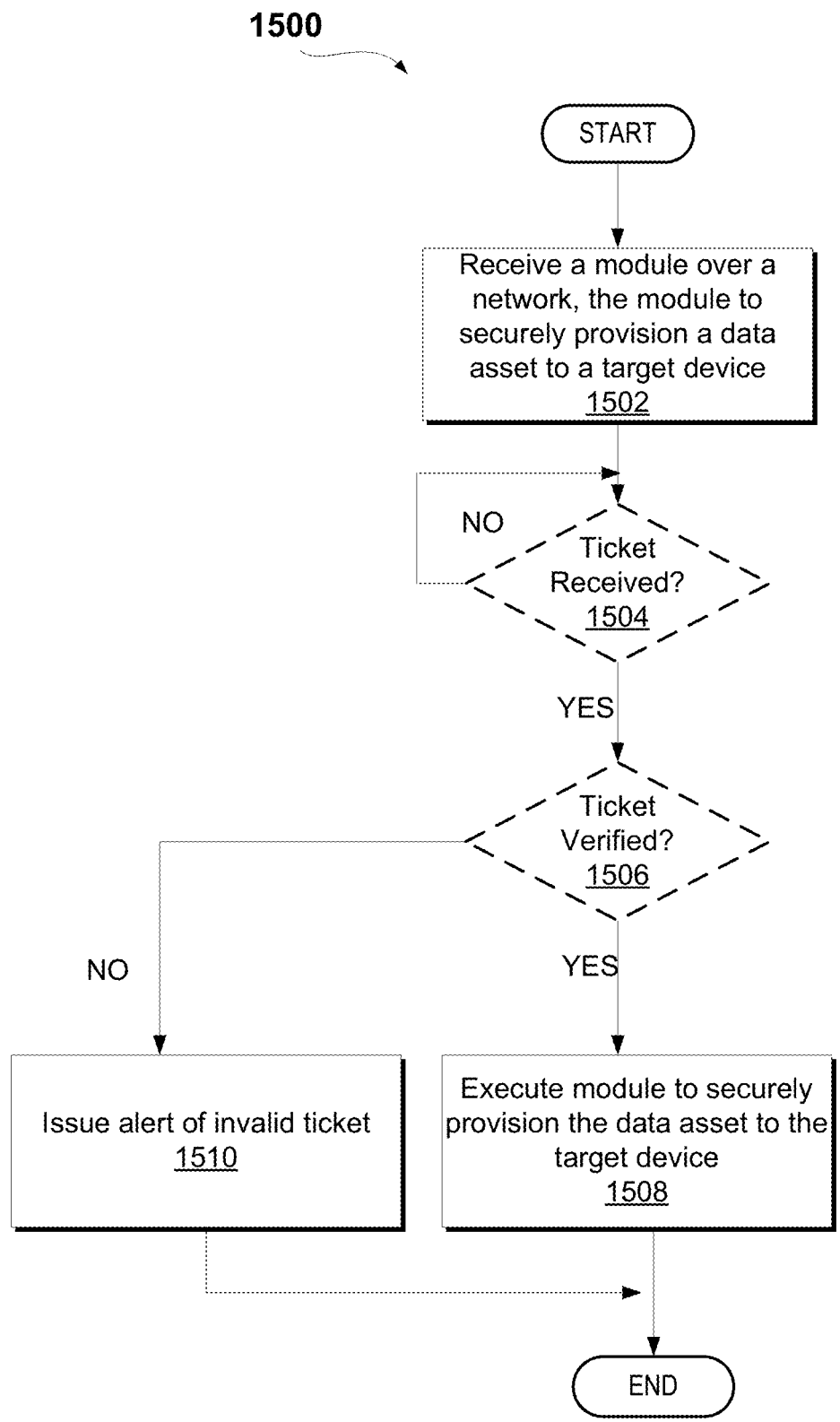
FIG. 15 is a flow diagram of a method of ticketing a Module to securely provision a data asset to a target device according to one embodiment.

FIG. 15 is a flow diagram of a method 1500 of ticketing a Module to securely provision a data asset to a target device according to one embodiment. Method 1500 may be performed by processing logic that may comprise hardware (e.g., circuitry, dedicated logic, programmable logic, microcode, etc.), software, firmware or a combination thereof. In one implementation, Appliance device 108 of FIGS. 1-3 performs method 1500. In one implementation, the Appliance device 108 or THID component 1400 of FIG. 14 performs the method 1500. In other implementations, other components of the CM system 100 described herein may perform some or all of the operations of the method 1500.

Referring to FIG. 15, the method 1500 begins with receiving a Module over a network from a Service device of the CM system (block 1502). The Module is an application that securely provisions a data asset to a target device in an operation phase of a manufacturing lifecycle of the target device. The processing logic determines whether a ticket is received from the Service device over a network (block 1504). Upon receiving the ticket, the processing logic verifies the ticket (block 1506). When the ticket is verified, the processing logic executes the Module to securely provision the data asset to the target device (block 1508), and the method 1500 ends. When the ticket is not verified, the processing logic issues an alert of an invalid ticket (block 1510) and the method 1500 ends or the method 1500 returns to block 1504 to receive determine whether another ticket is received.

In a further embodiment, the ticket is a signed ticket authorization that permits execution of the Module a single time to prevent duplication of the data asset and prevent duplicate consumption of the data asset. The processing logic prevents duplication of the data asset and duplicate consumption of the data asset after the execution of the Module using the signed ticket authorization. In a further embodiment, the processing logic creates an audit log of execution of the Module using the ticket.

In one embodiment, the ticket includes a pair of N-bit strings, a ticket name representing a ticket type associated with a type of data asset, and a ticket identifier (ID) that identifies a particular data asset record. In another embodiment, the processing logic receives a PCD asset over the network in connection with the Module and the ticket. An input section of a Module file, containing the Module, associates a PCD type to a ticket type. The processing logic verifies the ticket by comparing a current ticket type of the ticket to the ticket type in the input section of the Module file. The ticket is verified when the ticket type and the current ticket type match.

In one embodiment, a HSM of the Appliance device maintains a list of current tickets for each of ticket names known to the Appliance device and maintains a counter that is used to prevent replay attacks. In a further embodiment, the processing logic receives at least one of the following ticket-related messages: a first ticket-related message from the Service device to obtain an internal state of the HSM and transfer the internal state to the Service device; a second ticket-related message to grant a new ticket to the HSM; or a third ticket-related message to remove the ticket from the HSM.

In another embodiment, the processing logic verifies the ticket by verifying a ticket index against a sequential index for the data asset, wherein the data asset is sequential data. In a further embodiment, the data asset is a PCD asset in a sequential PCD file that specifies a PCD type and a ticket type. The processing logic verifies the ticket by comparing a current ticket type in the ticket against the ticket type of the PCD asset and comparing a current PCD type against the PCD type of the PCD asset. The he ticket is verified when the current ticket type matches the ticket type of the PCD asset and the current PCD type matches the PCD type of the PCD asset.

In one embodiment, the data asset is a HDCP record containing a HDCP key and the ticket is a cryptographic key issued by the Service device for the HDCP record. The processing logic consumes the HDCP key when the ticket is verified to enforce a single-use and unique nature of HDCP key provisioning. The processing logic tracks a history of tickets issued by the Service device and detects a duplicate in the history of tickets. The processing logic generates an alert when the duplicate is detected in the history of tickets.

In another embodiment, the data asset is a HDCP record containing an encrypted HDCP key and a key selection vector (KSV) value. The processing logic tracks a history of the KSV value and performs a log-based check of the history to detect an offending duplicate. The log-based check is based on at least one of 1) logs of the Appliance device referencing a same one of the issued KSV values; 2) logs of sequences executed by Appliance device with a same one of the issued KSV values, 3) logs of consumed tickets by Appliance device; tickets, or 4) logs of a Tester device. The processing logic issues an alert when the duplicate is detected. In a further embodiment, the HDCP record is stored in a PCD asset and the KSV value in the PCD asset is readable by the Appliance device without knowledge of the HDCP key used by the HSM of the Appliance device to decrypt the encrypted HDCP key.

The following description indicates some use cases. A core set of use-cases, which serve as a basis for the design of CM System is summarized below.

Personalization

Personalization is provisioning of a unique device-specific key to CM Core. For security reasons it is broken into two steps, known as perso1 and perso2. In essence at each step a key split will be programmed into CM Core and internally recombined to produce a device-specific key.

Device Serialization

Device Serialization provides a unique serial number to a CM Core. This serial number appears random to conceal the information about production yield; however it is a function of a sequential number. This allows indexing of the pre-computed data used in Device Serialization and ensures ID uniqueness within a particular product.

Volatile RMA Rescreen Enable

When chips are shipped into the field, it is required that the hardware supported test features, needed to test the chip during manufacturing, aka design for test (DFT) features, are securely disabled. These features must also be securely enabled later when bad parts are returned through the RMA channel for failure analysis. CryptoManager™ provides a method for our customers to authenticate the device and authorize the provisioning of the rescreen test enable/disable operation per device Non-Volatile RMA Rescreen Enable Same as above except not persistent through power on reset.

HDCP Key Management & Provisioning

CM System must support secure bulk import of HDCP keys from an issuing authority and secure provisioning of a unique HDCP key to a particular CM Core. A mechanism to bind each HDCP key to a unique identifier and track each HDCP key throughout its lifecycle must also be provided.

Provisioning Authority Key Provisioning

CM System must be able to provide keys to CM Cores that are unknown to the customer. These keys also have to be tied to a unique identifiers and a pairing of such keys and their identifiers should be able to facilitate usage of such keys.

Figure 16:
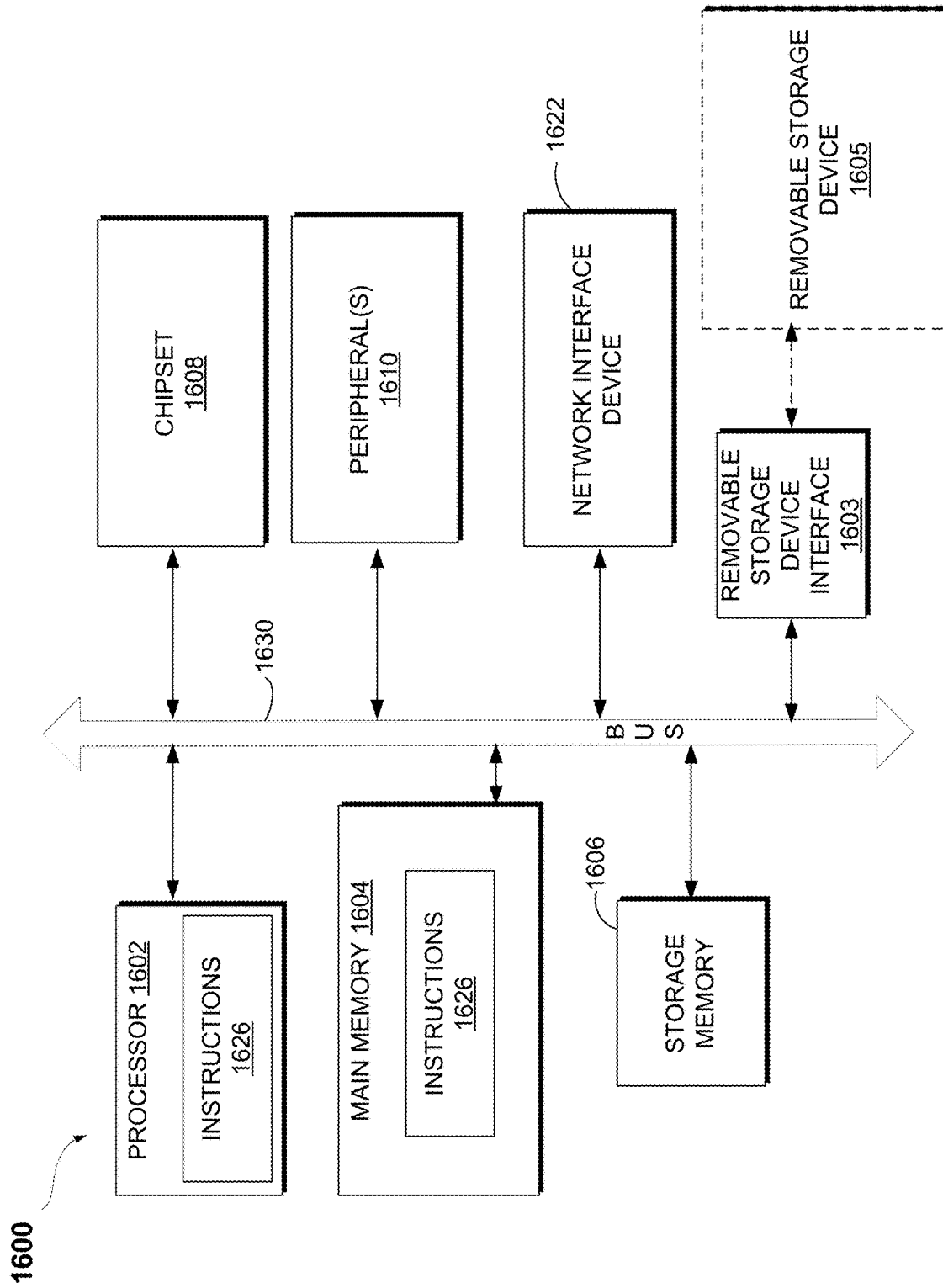
FIG. 16 is a diagram of one embodiment of a computer system, including a processor and a removable storage device interface to connect to a removable storage device according to one embodiment.

FIG. 16 is a diagram of one embodiment of a computer system 1600, including a processor 1602 and a removable storage device interface 1603 to connect to a removable storage device 1605 according to one embodiment. The removable storage device interface 1603 is configured to connect to the removable storage device 1605. The processor 1602 is operable to execute instructions 1626 (or software) in a device definition phase of a manufacturing lifecycle of a CM device. The instructions 1626 may include instructions that are stored in main memory 1604 or in removable storage device 1805 and executed by the processor 1602 to perform various operations regarding Modules, PCD, and tickets as described herein. In one embodiment, the computer system 1600 represents the Root device 102. In another embodiment, the computer system 1600 represents the Service device 104. In another embodiment, the computer system 1600 represents the Appliance device 108. Alternatively, the computer system 1600 may represent any of the other devices described herein, such as the CRISP device 110.

The computer system 1600 in some cases may be connected (e.g., networked) to other machines in a LAN, an intranet, an extranet, or the Internet. The computer system 1600 can be a host in a cloud, a cloud provider system, a cloud controller, a server, a client, or any other machine. The computer system 1600 can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1600 includes a processor 1602 (e.g., host processor or processing device), a main memory 1604 (e.g., read-only memory (ROM), flash memory, dynamic random access memory (DRAM), a storage memory 1606 (e.g., flash memory, static random access memory (SRAM), etc.), and a secondary memory 1618 (e.g., a data storage device in the form of a drive unit, which may include fixed or removable computer-readable storage medium), which communicate with each other via a bus 1630.

Processor 1602 represents one or more general-purpose processing devices such as a microprocessor, central processing unit, or the like. More particularly, the processor 1602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1602 may also be one or more special-purpose processing devices such as an application specific integrated circuit (ASIC), a field programmable gate array (FPGA), a digital signal processor (DSP), network processor, or the like.

In one embodiment, the processor 1602 may reside on a first integrated circuit and the main memory 1604 may reside on a second integrated circuit. For example, the integrated circuit may include a host computer (e.g., CPU having one more processing cores, L1 caches, L2 caches, or the like), a host controller or other types of processors 1602. The second integrated circuit may include a memory device coupled to the host device, and whose primary functionality is dependent upon the host device, and can therefore be considered as expanding the host device's capabilities, while not forming part of the host device's core architecture. The memory device may be capable of communicating with the host device. For example, the memory device may be a single IC or a multi-IC Module including any combination of single IC devices on a common integrated circuit substrate. The components of FIG. 16 can reside on "a common carrier substrate," such as, for example, an integrated circuit ("IC") die substrate, a multi-IC Module substrate or the like. Alternatively, the memory device may reside on one or more printed circuit boards, such as, for example, a mother board, a daughter board or other type of circuit card. In other implementations, the main memory and processor 1602 can reside on the same or different carrier substrates.

The computer system 1600 may include a chipset 1608, which refers to a group of integrated circuits, or chips, that are designed to work with the processor 1602 and controls communications between the processor 1602 and external devices. For example, the chipset 1608 may be a set of ICs on a motherboard that links the processor 1602 to very high-speed devices, such as main memory 1604 and graphic controllers, as well as linking the processing device to lower-speed peripheral buses of peripherals 1610, such as USB, PCI or ISA buses. In one embodiment, the removable storage device interface 1603 can be implemented in the chipset 1608.

The computer system 1600 may further include a network interface device 1622. The computer system 1600 also may include one or more peripherals 1610, such as a video display unit (e.g., a liquid crystal display (LCD)) connected to the computer system through a graphics port and graphics chipset, an alphanumeric input device (e.g., a keyboard), a cursor control device (e.g., a mouse), a signal generation device (e.g., a speaker), or the like. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

Domains

Domains, as used in the CM system, may be used to reflect a partitioning of target devices 106 into smaller sets, such as to corresponding to a customer's view of different products, chip series, original equipment manufacturers (OEMs), or the like. Domains may also be used in a CM system to determine an applicability of PCD Templates and Module Templates. To elaborate on partitioning target devices 106, a set of CM Cores may belong to a particular chip series. Chip series, as described above, refers to a set of Products sharing the same security parameters within CM Cores (e.g., a set of Products sharing a common set of attributes, e.g. RsbSigningKey). For example, the set of CM Cores may share a key pair which signs a Sequence on Root's behalf (using RsbSigningPriv) as well as a set of other base keys used to provision these cores. The set of CM Cores, sharing the same key pair for the sequence can be considered a Module domain. A set of CM Cores can be partitioned based on Product (a.k.a. chipID), ChipSeries, or the like. A particular Product can belong only to a single chipSeries. Any CM Core within a particular ChipSeries may also belong to some Product.

Figure 17:
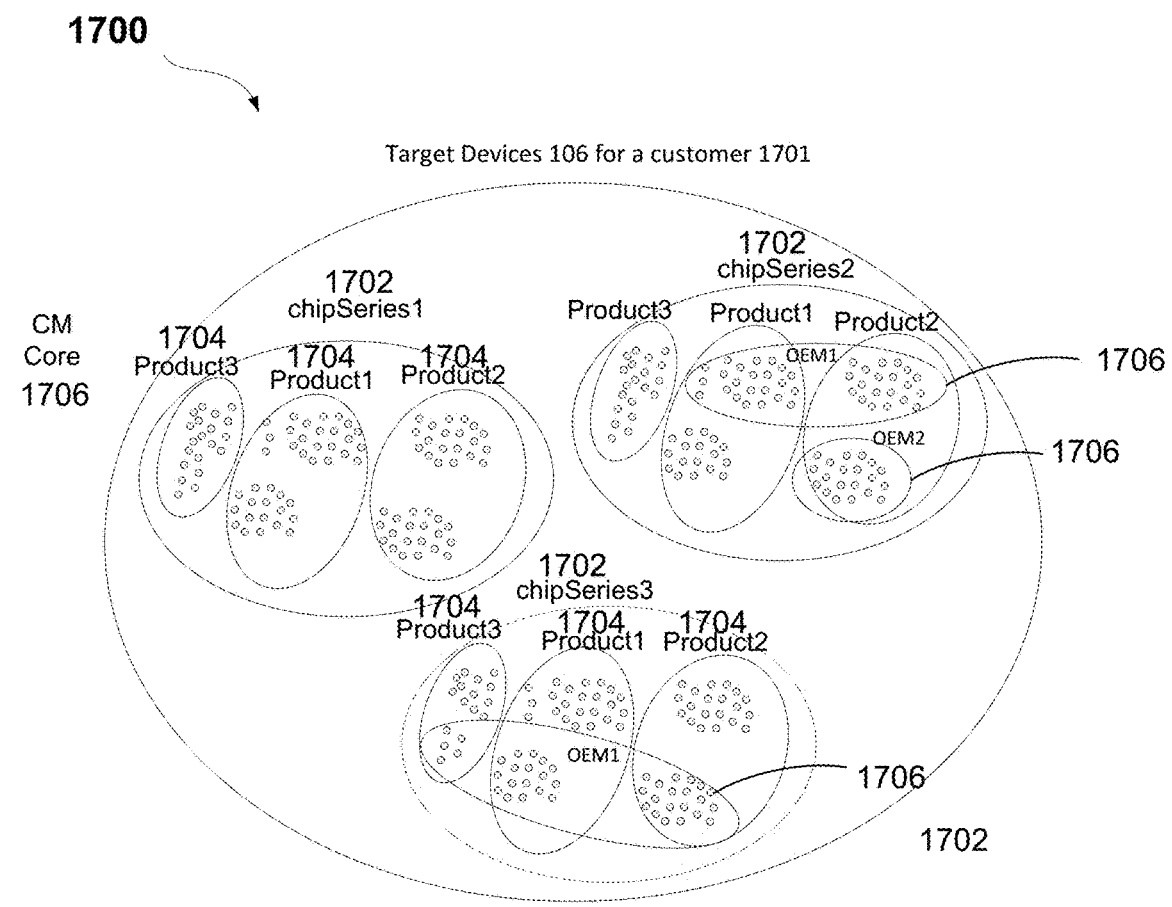
FIG. 17 is a diagram of a domain partition according to one embodiment.

FIG. 17 is a diagram of a domain partition 1700 according to one embodiment. The domain partition 1700 is a partition of target devices 106 (e.g., CM Cores) for a customer 1701. The domain partition 1700 includes a first level of grouping based on a chip series 1702 (chipSeries1-3). Each of the partitions of chip series 1702 includes a second level of groupings based on products 1704. Each product 1704 includes multiple target devices 106, each of which includes a CM Core 1706 in this implementation. In some cases, a third level of groupings can be based on an original equipment manufacturer (OEM) 1706. For example, within one chip series 1702 (chipSeries2), one OEM may include multiple target devices with CM Cores 1706 from a first product type (product1) and multiple target devices with CM Cores 1706 from a different product type (product 2). For another example, within the same chip series 1702 (chipSeries2), another EOM may include multiple target devices with CM Cores 1706 in the same product type (product2). Also, as illustrated in FIG. 17, the groupings based on OEM 1706 may cover more than two product types, such as illustrated in the OEM 1706 that spans three product types (Product1-3). Alternatively, the domains can be defined based on other common attributes within a set of CM Cores 1706.

Domains can be used to unify creation of particular assets that are based on a particular set of data. For example, Modules within a chip series 1702 (chipSeries1) may be based on the same root signing private key (e.g., RsbSigningPriv key). Alternatively, the CM Cores 1706 may be portioned according to other sets of metadata.

Also, all CM Cores 1706 within a Domain share a set of metadata. In order to specify several data values and keys in the CM Cores 1706, two data packages can be used in the CM system, including CM Netlist and HW CONFIG. Netlist is the description of the parts or devices used to produce CM Core and their interconnections. HW CONFIG values are exported from Root to become a part of the hardware Netlist, and the HW CONFIG values can be customer-specific values. There are several values (keys and IDs) that are shared by the CM System (e.g. Root, Modules) and by CM Core hardware. For example, RsbSigningPub is used by the CM Core 1706 to authenticate the Sequence it receives from the Appliance HSM 111 through the Tester device 112. Another example of such a key is the chipVendorDevice-AesKey. This key is used as a base key for personalization. In particular, it is used to compute the validator, which is checked by the CM Core 1706 to authenticate the Appliance 108. In addition to keys, there are constants that need to be a part of the Netlist. The following table contains example values that can be exported to become a part of the Netlist:

| Name/ini name/hw spec name | Description | Len (bits) | Gen'e dby | Exported |
|---|---|---|---|---|
| CoreVersion/ cmCoreVersion/ cmNetlistVersion | Netlist release version, set by CRI. Sequences use this value to confirm the CM is of the appropriate version when there is some version-dependency of the sequence (e.g. change to supported commands). MSB = major, LSB = minor. | 16 | CRISP | CRISP -> Root -> Netlist |
| Build/ build/cmBuild | Netlist build number, set by CRI. May be automatically incremented based on information from revision control. | 8 | CRISP | CRISP -> Root -> Netlist |
| hwConfigType | Identification/usage restriction flag. | 1 | CRISP | As a part of the Module Template |
| chipSeries | Chip series. The 0x0000 value is not to be used in production. | 16 | CRISP | CRISP -> Root -> Netlist |
| model Selection | Enumeration used to identify the type of EA | 8 | CRISP | CRISP -> Root -> Netlist |
| chipSeriesAesKey | Base AES Key | 256 | Root | Root -> Netlist |
| chipSeriesAesKey Checksum | truncated hash | 16 | Root | Root -> Netlist |
| chipSeriesKeyUnw rapAesKey | Secures p1/p2 keysplit combine. Not a base key. | 256 | Root | Root -> Netlist |
| chipSeriesKeyUnw rapAesKeyChecks um | truncated hash | 16 | Root | Root -> Netlist |
| RsbSigningKeyLs bs | Public key to verify RSB | 2048-960 | Root | Root -> netlist |
| publicKeyMsbs | Root and Delegate public keys' MSBs | 960 | CRISP | CRISP -> Root |

For PCD or Modules, creation of a specific entity based on a template (PCD Template or Module Template) may be expressed as follows:

Template+Domain=>Entity

Namely, in order to create a Module, a Module Template may be selected and a Domain can be specified. Different Module Templates may have different Domain types, but should specify a domain. Likewise, PCD Type creation may use a PCD Template and a Domain. The following description provides further examples of PCD Type Domains and Module Domains.

Module Domains and PCD Type Domains

From the practical perspective, the concepts of Module Domain and PCD Type Domain help describe how many different Modules or PCD Types are created based on a particular Model Template or PCD Template. In order to produce a Module, a Module Template is bound to a particular Module Domain. For instance, a Module Template can describe how to provide serialization and personalization (say named "serial+perso12"). A particular Module, which provides serialization and personalization for a particular chipSeries (let's say "cs12"), would be named "serial+perso.cs12" and can only be used with the CM Cores 1706 that belong to chipSeries cs12. Similarly, say PCD Template "serial+perso12" can provide device ID data and personalization data for chip ID "cid123". The full identifier of the PCD Type based on "serial+perso12" Template providing assets to "cid123" would be the combination of both and would be named "serial+perso12.cid123". The following table includes example use cases with the PCD Type Domain and the Module Domain:

| Use Case | PCD Domain | Module Domain |
|---|---|---|
| srl_cvdak_padak | srl_cvdak: Product padak: ChipSeries | Product |
| HDCP | All | ChipSeries |
| *debug_unlock | N/A | ChipSeries |

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A target device comprising:
    a System on Chip (SoC);
    a register interface located on a SoC bus; and
    a cryptographic circuit to control feature activation, configuration management, and secure key management of the target device, wherein the cryptographic circuit is accessed via the register interface, wherein the cryptographic circuit is to:
       receive a module sequence from a tester device located at a first facility during an operation phase of a manufacturing lifecycle of the target device, wherein the tester device is operatively coupled to the target device and is an untrusted device, wherein the module sequence is generated by a module, the module being an application that, when executed by an appliance device, securely provisions a data asset to the target device via the tester device; and
       perform a sequence of operations that securely provisions the data asset of the module to the SoC.

2. The target device of claim 1, wherein the data asset is a pre-computed data (PCD) asset specifically corresponding to the target device.

3. The target device of claim 2, wherein the PCD asset comprises at least one of a root-generated key, a serial number, or a High-bandwidth Digital Content Protection (HDCP) key.

4. The target device of claim 1, wherein the data asset is firmware.

5. The target device of claim 1, wherein the data asset is a pre-computed data (PCD) file, wherein the PCD file is encrypted so that only the appliance device has access to the PCD file.

6. The target device of claim 1, wherein the module sequence comprises data derived from tester information, pre-computed data (PCD), and a delegate signing block (DSB).

7. The target device of claim 1, wherein the cryptographic circuit is further to:
receive a signing key, associated with the appliance device, from the tester device; and
authenticate the module sequence using the signing key.

8. The target device of claim 1, wherein the module is associated with a ticket, wherein the ticket is data that enables enforcement of usage count limits and uniqueness of the data asset being securely provisioned to the target device.

9. The target device of claim 1, wherein the module is delivered to the appliance device over a network from a Service device at a second facility, different from the first facility.

10. A method comprising:
receiving, by a target device comprising an System on Chip (SoC) and a cryptographic circuit, a module sequence from a tester device located at a first facility during an operation phase of a manufacturing lifecycle of the target device, wherein the module sequence is generated by a module, the module being an application that, when executed by an appliance device, securely provisions a data asset to the target device via the tester device, wherein the tester device is an untrusted device; and
performing, by the cryptographic circuit, a sequence of operations that securely provisions the data asset of the module to the SoC.

11. The method of claim 10, wherein the data asset is a pre-computed data (PCD) asset specifically corresponding to the target device.

12. The method of claim 11, wherein the PCD asset comprises at least one of a root-generated key, a serial number, or a High-bandwidth Digital Content Protection (HDCP) key.

13. The method of claim 10, The method of claim 2, wherein the data asset is firmware.

14. The method of claim 10, wherein the data asset is a pre-computed data (PCD) file, wherein the PCD file is encrypted so that only the Appliance device has access to the PCD file.

15. The method of claim 10, wherein the Module sequence comprises data derived from tester information, pre-computed data (PCD), and a delegate signing block (DSB).

16. The method of claim 10, The method of claim 2, further comprising:
receiving, by the cryptographic circuit from the tester device, a signing key associated with the appliance device; and
authenticating, by the cryptographic circuit, the module sequence using the signing key.

17. The method of claim 10, wherein the module is associated with a ticket, wherein the ticket is data that enables enforcement of usage count limits and uniqueness of the data asset being securely provisioned to the target device.

18. The method of claim 10, wherein the Module is delivered to the Appliance device over a network from a Service device at a second facility, different from the first facility.

19. A non-transitory computer-readable storage medium storing instructions that, when executed by a processor of a target device comprising an System on Chip (SoC) and a cryptographic circuit, cause the cryptographic circuit to perform operations comprising:
receiving a module sequence from a tester device located at a first facility during an operation phase of a manufacturing lifecycle of the target device, wherein the module sequence is generated by a module, the module being an application that, when executed by an appliance device, securely provisions a data asset to the target device via the tester device, wherein the tester device is an untrusted device; and
performing a sequence of operations that securely provisions the data asset of the module to the SoC.

20. The non-transitory computer-readable storage medium of claim 19, wherein the operations further comprise:
receiving, from the tester device, a signing key associated with the appliance device; and
authenticating the module sequence using the signing key.

* * * * *